(12) United States Patent  
Mestery et al.

(10) Patent No.: US 12,513,114 B2  
(45) Date of Patent: Dec. 30, 2025

(54) NETWORK SECURITY FUNCTIONS FOR DYNAMIC CONSTRUCTION AND PROGRAMMATIC PLACEMENT

(71) Applicant: Cisco Technology, Inc., San Jose, CA (US)

(72) Inventors: Kyle Andrew Donald Mestery, Woodbury, MN (US); Vincent Parla, North Hampton, NH (US); John Michael Lake, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 9 days.

(21) Appl. No.: 18/752,469

(22) Filed: Jun. 24, 2024

(65) Prior Publication Data

US 2025/0039130 A1   Jan. 30, 2025

Related U.S. Application Data

(60) Provisional application No. 63/516,448, filed on Jul. 28, 2023.

(51) Int. Cl.
 *H04L 9/40* (2022.01)
(52) U.S. Cl.
 CPC ...... *H04L 63/0236* (2013.01); *H04L 63/0218* (2013.01); *H04L 63/0263* (2013.01);
 (Continued)
(58) Field of Classification Search
 None
 See application file for complete search history.

(56) References Cited

U.S. PATENT DOCUMENTS 9,985,866 B1   5/2018 Rajagopal et al.  
10,805,873 B2 * 10/2020 An ................... H04W 48/12  
(Continued)

FOREIGN PATENT DOCUMENTS

CN   117061166 A   11/2023  
CN   117155696 A   12/2023

OTHER PUBLICATIONS

Chris L., et al., "TOSCA Version 2.0 Committee Specification Draft 05", OASIS Open, Jan. 19, 2023, pp. 1-183, XP093270804, Retrieved from https://docs.oasis-open.org/tosca/TOSCA/v2.0/csd05/TOSCA-v2.0-csd05.pdf, Abstract.

(Continued)

*Primary Examiner* — Quang N Nguyen  
(74) *Attorney, Agent, or Firm* — Polsinelli P.C.

(57) ABSTRACT

A system and method are provided for placing network functions among respective locations in a network. The locations at which the network functions are placed can be nodes and network devices within the network. These nodes can be selected, e.g., based on which network devices have available capacity and or specialized hardware (e.g., accelerator sin a data processing units (DPUs)) that is optimized for particular network functions. The network functions can include an inline network function that is provisioned directly in a data plane of one of the network devices (e.g., in-lined directly in a hardware offload device without a virtual machine and without a container). The decision of where to place the network functions can be based on a performance metric (e.g., representing available computational/memory resources at the network nodes) and/or a network-function metric (e.g., representing consumed computational/memory resources by the network functions) to improve system performance.

17 Claims, 13 Drawing Sheets

(52) U.S. Cl.
CPC ........ *H04L 63/1425* (2013.01); *H04L 63/145* (2013.01); *H04L 63/166* (2013.01); *H04L 63/20* (2013.01)

(56) References Cited

U.S. PATENT DOCUMENTS

| | | |
|---|---|---|
| 10,917,317 B2* | 2/2021 | Stammers ........... H04L 41/5054 |
| 12,250,706 B1* | 3/2025 | Qureshi ................ H04W 16/14 |
| 2021/0385159 A1* | 12/2021 | Mehmedagic ...... H04L 41/0895 |
| 2022/0385631 A1 | 12/2022 | McDowall et al. |
| 2023/0099370 A1 | 3/2023 | Parla et al. |
| 2023/0231830 A1 | 7/2023 | Shin et al. |
| 2023/0275968 A1 | 8/2023 | Young et al. |

OTHER PUBLICATIONS

European Search Report for European Application No. 25152577, dated May 8, 2025, 9 Pages.

\* cited by examiner

NETWORK SECURITY FUNCTIONS FOR DYNAMIC CONSTRUCTION AND PROGRAMMATIC PLACEMENT

CROSS-REFERENCE TO RELATED APPLICATIONS

This application priority to U.S. provisional application No. 63/516,448, titled "Data Processing Units (DPUs) and extended Berkley Packet Filters (eBPFs) for Improved Security," and filed on Jul. 28, 2023, which is expressly incorporated by reference herein in its entirety.

BACKGROUND

A computer network can include multiple nodes with network devices such as servers, routers, and switches at the nodes. Different network functions, such as routing data flows and performing security services, can be performed at these nodes. These network functions can be virtualized, e.g., using containers or virtual machines operating on a server.

A distributed firewall can be used to augment and supplement a traditional single-point firewall. A firewall is a network security system that monitors and controls incoming and outgoing network traffic based on predetermined security rules. A firewall typically establishes a barrier between a trusted network and an untrusted network, such as the Internet. A single point of protection against malicious software is not necessarily optimal and is not always feasible.

A distributed firewall can include a security application on a host machine of a network that protects the servers and user machines of its enterprise's networks against unwanted intrusion. A firewall is a system or group of systems (e.g., a router, proxy, or gateway) that implements a set of security rules to enforce access control between two networks to protect the trusted network from the untrusted network. The system or group of systems filter all traffic regardless of its origin—the Internet or the internal network. The distributed firewall can be deployed behind a traditional firewall to provide a second layer of defense. The advantages of the distributed firewall allow security rules (policies) to be defined and pushed out on an enterprise-wide basis, which is beneficial for larger enterprises.

For example, a distributed firewall can be a hardware-assisted firewall that supplements—without replacing— other security features in the Cisco Application Centric Infrastructure (ACI) fabric such as CISCO Adaptive Security Virtual Appliance (ASAv) or secure zones created by micro-segmentation with CISCO ACI Virtual Edge. The distributed firewall can provide dynamic packet filtering, e.g., by tracking the state of TCP and File Transfer Protocol (FTP) connections and blocking packets unless they match a known active connection. Traffic from the Internet and the internal network can be filtered based on policies that can be configured in the APIC GUI. The distributed firewall can be distributed within the network by, e.g., tracking connections even when VMs are moved to other servers. The distributed firewall can prevent SYN-ACK attacks. For example, when a provider VM initiates SYN-ACK packets, the distributed firewall on the provider, CISCO ACI Virtual Edge can drop these packets because no corresponding flow (connection) is created. The distributed firewall can support TCP flow aging.

Improved systems and methods are desired for efficiently placing network functions among the nodes of a network.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
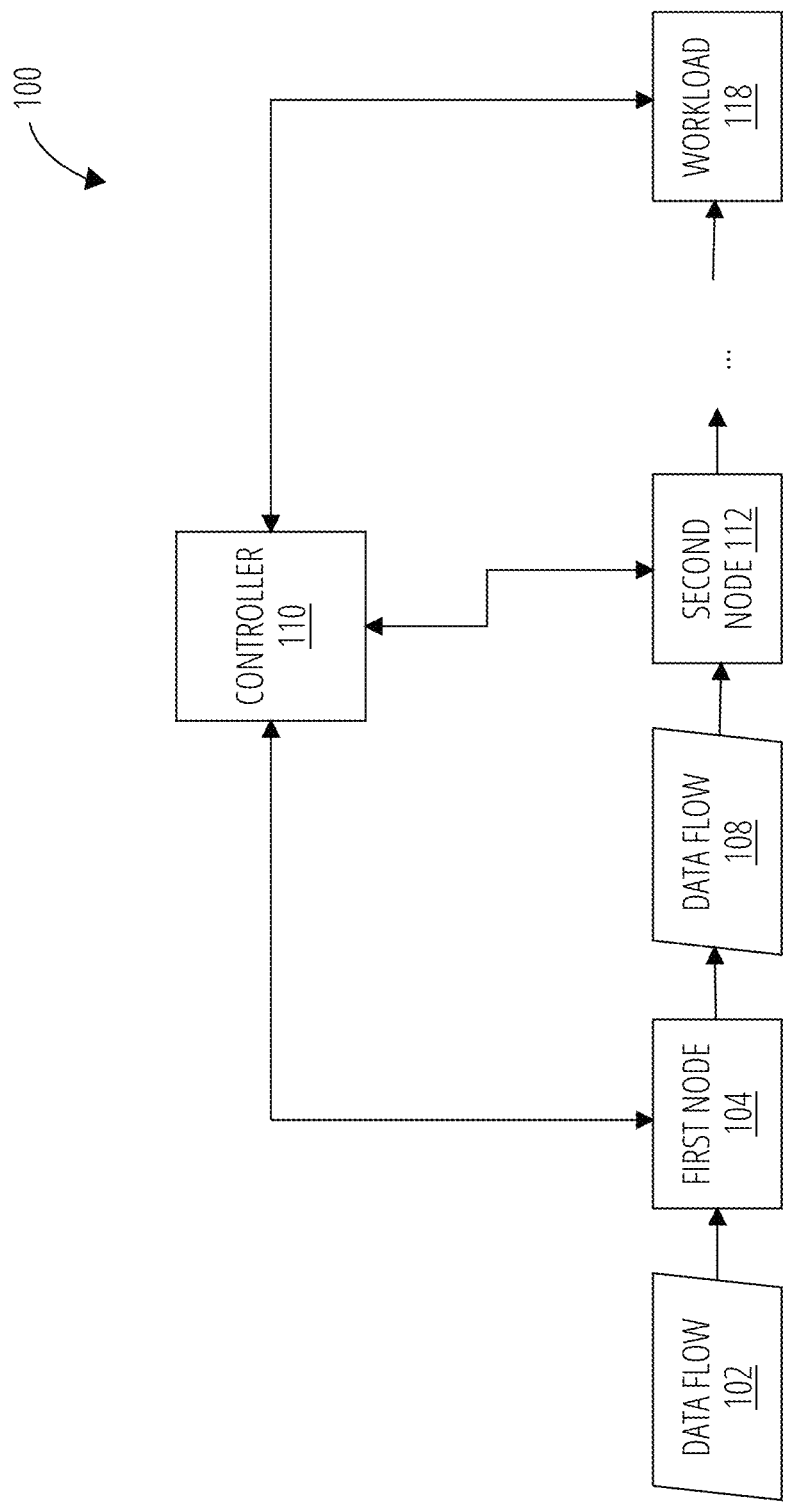
FIG. 1 illustrates a block diagram of an example of a subsystem of a network that includes data processing units (DPUs) and extended Berkley packet filters (eBPFs) that perform various network functions, in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Abbreviations

The following abbreviations and acronyms are used herein:
"NF" refers to "network function"
"VNF" refers to "network function"
"CPU" refers to "central processing unit"
"DPU" refers to "data processing unit"
"GPU" refers to "graphics processing unit"
"NPU" refers to "network processing unit"
"BPF" refers to "Berkley Packet Filter"
"eBPF" refers to "extended Berkley Packet Filter"
"ACI" refers to "application centric infrastructure"
"ASAv" refers to "adaptive security virtual appliance"
"TCP" refers to "transmission control protocol"
"UDP" refers to "user datagram protocol"
"FTP" refers to "file transfer protocol"
"VM" refers to "virtual machine"
"VPN" refers to "virtual private network"
"OS" refers to "operating system"
"SD-WAN" refers to "software-defined wide area network"
"RISC" refers to "reduced instruction set computer"
"CISC" refers to "complex instruction set computing"
"ARM" refers to "advanced RISC machines"
"GUI" refers to "graphical user interface"
"IPsec" refers to "Internet protocol security"
"IP" refers to "Internet protocol"
"DPI" refers to "deep packet inspection"
"IPS" refers to "intrusion prevention system"
"OSI" refers to "open systems interconnection"
"L2" refers to "layer 2 of the OSI model"
"L3" refers to "layer 3 of the OSI model"
"L7" refers to "layer 7 of the OSI model"
"LLC" refers to "logical link control"
"MAC" refers to "medium access control"
"WAF" refers to "web application firewall"
"IPv6" refers to "Internet protocol version 6"
"ASIC" refers to "application-specific integrated circuit"
"FPGA" refers to "field programable gate array"
"ToR" refers to "top of rack"
"Geneve" refers to "generic network virtualization encapsulation"
"OVS" refers to "open virtual switch"
"RDMA" refers to "remote direct memory access"
"ROCE" refers to "RDMA over Converged Ethernet"
"VXLAN" refers to "Virtual extensible Local-Area Network"
"VTEP" refers to "VXLAN tunnel end point"
"RSS" refers to "receive side scaling"
"LRO" refers to "large receive offload"
"SR-IOV" refers to "single root I/O virtualization"
"VirtIO" refers to "virtual input & output"
"RAN" refers to "radio access network"
"TLS" refers to "transport layer security"
"AES" refers to "advanced encryption standard"
"PKC" refers to "public-key cryptograph"
"SHA" refers to "secure hashing algorithm"
"iSCSI" refers to "Internet Small Computer System Interface"
"QoS" refers to "quality of service"
"NFV" refers to "network function virtualization"
"SSL/TLS" refers to "secure sockets layer and transport layer security"
"BGP" refers to "border gateway protocol"
"SYN" refers to "synchronization message"
"DMZ" refers to "demilitarized zone"
"WWW" refers to "world wide web"
"DoS" refers to "distributed denial of service"
"AS" refers to "autonomous system"
"HTTP" refers to "hypertext transfer protocol"
"HTTPS" refers to "hypertext transfer protocol secure"
"NIC" refers to "network interface controller"
"SmartNIC" refers to "smart network interface controller"
"VIP" refers to "virtual Internet protocol"
"HA" refers to "high availability"
"OSPF" refers to "open shortest path first"
"EIGRP" refers to "enhanced interior gateway routing protocol"
"RU" refers to "rack unit"
"OSA" refers to "open systems adapter"
"IPC" refers to "interprocess communication"
"VLAN" refers to "virtual local area network"
"GigE" refers to "gigabit ethernet"
"FWSM" refers to "firewall services module"
"CEF" refers to "CISCO Express Forwarding"
"ROM" refers to "read-only memory"
"RAM" refers to "random access memory"
"REST" refers to "representational state transfer"
"NETCONF" refers to "network configuration protocol"
"CLI" refers to "command-line interface"
"API" refers to "application programming interface"
"RIB" refers to "routing information base"
"FIB" refers to "forwarding information base"
"SNMP" refers to "simple network management protocol"
"PPP" refers to "point-to-point protocol"
"LACP" refers to "link aggregation control protocol"
"BFD" refers to "bidirectional forwarding detection"
"CFM" refers to "connectivity fault management"
"ES-IS" refers to "end system-to-intermediate system"
"ARP" refers to "address resolution protocol"
"NDP" refers to "neighbor discovery protocol"
"UPnP" refers to "universal plug and play"
"SSDP" refers to "simple service discovery protocol"
"IS-IS" refers to "intermediate system to intermediate system"
"TRILL" refers to "transparent interconnection of lots of links"
"SPB" refers to "shortest path bridging"
"STP" refers to "spanning tree protocol"
"RSVP" refers to "resource reservation protocol"
"TE" refers to "traffic engineering"
"MPLS" refers to "multiprotocol label switching"
"SOAP" refers to "simple object access protocol"
"NAT" refers to "network address translation"
"SAVI" refers to "source address validation improvement"
"sFlow" refers to "sampled flow"
"ACL" refers to "access control list"
"ICMP" refers to "internet control message protocol"
"SSH" refers to "secure shell"
"TTL" refers to "time to live"
"FQDN" refers to "fully qualified domain name"
"ID" refers to "identity"
"HA" refers to "high availability"
"VFS" refers to "virtual file system"
"JIT" refers to "just-in-time"

"PCI-e" refers to "peripheral component interconnect express"

"SSD" refers to "solid state drive"

"MIPS" refers to "microprocessor without interlocked pipeline stages"

"PowerPC" refers to "performance optimization with enhanced RISC-performance computing"

Overview

In some aspects, the techniques described herein relate to a method for selecting locations within a network at which to place security services and/or network functions, the method including: determining values of a performance metric at respective locations within a network; determining values of a NF metric for one or more network functions that process one or more data flows within the network; analyzing the values of the performance metric and the network-function metric to generate an analysis result; selecting, from the respective locations and based on the analysis result, one or more selected locations within the network to perform the one or more network functions; and performing, at the one or more selected locations, the one or more network functions on the one or more data flows.

In some aspects, the techniques described herein relate to a method, wherein the respective locations are nodes within the network, the nodes including network components/devices.

In some aspects, the techniques described herein relate to a method, wherein the one or more network functions include an inline network function that is configured to be in-lined directly in a hardware offload component at one of the one or more selected locations, and the inline network function is performed without a virtual machine and without a container.

In some aspects, the techniques described herein relate to a method, wherein the performance metric represents: (i) a quantity of computational resources available at the respective locations; (ii) types of computational resources available at the respective locations; (ii) throughput capacities available at the respective locations; and/or (iii) indicators of resource limits at the respective locations (e.g., indicia of data-flow bottlenecks, such as number percentage of dropped pulses or (average) packet latencies through the respective locations).

In some aspects, the techniques described herein relate to a method, wherein the network-function metric represents: (i) a quantity of computational resources consumed by respective NFs of the one or more network functions; (ii) efficacies of the one or more network functions for respective data flows through the network; and/or (iii) likelihoods that the data flows at the respective locations present a threat that the one or more network functions defend against.

In some aspects, the techniques described herein relate to a method, wherein the network-function metric indicates that a first network function of the one or more network functions is configurable to be accelerated by being executed on a first type of circuitry more than a second network function of the one or more network functions is accelerated by being executed on the first type of circuitry, the performance metric indicates that a first network component at a first location within the respective locations includes the first type of circuitry and a second location of the respective locations does not include the first type of circuitry, and based on the analysis result, the first location and the first network component are selected to perform the first network function, and the second location and the second network component are selected to perform the second network function.

In some aspects, the techniques described herein relate to a method, wherein the network-function metric indicates that a first network function of the one or more network functions mitigates a first security threat, the performance metric indicates a higher likelihood of mitigating effects of the first security threat when the first network function is placed at a first location within the respective locations relative to when the first network function is placed at a second location of the respective locations, and based on the analysis result, the first network function is placed at the first location.

In some aspects, the techniques described herein relate to a method, wherein the network-function metric indicates that a first network function consumes a given quantity of computational resources, the performance metric indicates consuming the given quantity of computational resources at a first location within the respective locations will result in more dropped packets or more packet delays than consuming the given quantity of computational resources at a second location of the respective locations, and based on the analysis result, the first network function is placed at the second location.

In some aspects, the techniques described herein relate to a method, wherein the analysis result indicates improved performance of the network when a first network function of the one or more network functions is placed at a first location within the respective locations and a second network function of the one or more network functions is placed at a second location within the respective locations, and based on the analysis result, the first network function is placed at the first location and the second network function is placed at the second location.

In some aspects, the techniques described herein relate to a method, wherein the respective locations include nodes in the network, and one or more of the nodes include a switch, a data processing unit (DPU), a Berkley packet filter (BPF), and/or an extended BPF (eBPF).

In some aspects, the techniques described herein relate to a method, wherein the one or more network functions include an inline network function that is a serverless network function that operates in hardware of network components without a container, without a virtual machine, and without a host; the inline network function is dynamically provisioned on a selected network device of the network components at the respective locations based on whether the analysis result indicates a benefit and/or available computational resources for the inline network function at the selected network device; and the network component includes a data processing unit (DPU), eBPF, switching hardware, application-specific integrated circuit (ASIC), or field programmable gate array (FPGA).

In some aspects, the techniques described herein relate to a method, wherein provisioning the inline network function is provisioned/instantiated includes using a serverless API call to instantiate the inline network function; and causing, in response to the serverless API call, an API backend to deploy a selected program from a group of programs, the selected program being selected based on a target network component at the selected location into which the inline network function is to be provisioned, wherein the group of programs includes: (i) an eBPF program configured to be executed on host CPUs; (ii) eBPF program configured to be executed on DPUs; (iii) a P4 program configured to be executed on the CPUs; (iv) a P4 program configured to be executed on the DPUs; (v) an eBPF program configured to be executed on switches; (iv) a P4 program configured to be executed on the switches; (vi) a program configuring ASICs; and (vii) a program configuring FPGA (e.g. SiliconOne, Broadcom, or Intel equivalents).

In some aspects, the techniques described herein relate to a method, further comparing: updating the analysis result and the one or more selected locations within the network to perform the one or more network functions based on changes to the values of the performance metric and/or the network-function metric; and moving the one or more network functions to the updated one or more selected locations by provisioning the one or more network functions on the updated one or more selected locations.

In some aspects, the techniques described herein relate to a method, wherein updating the analysis result and the one or more selected locations is triggered by: a change in flow pattern or path of the one or more data flows; a change in an attribute of the one or more data flows, the attribute being related to a function of the one or more network functions; (e.g., the attribute corresponding to a security threat that is mitigated by a security service provided by the one or more network functions—could be to undisclosed upstream NF already filtering for suspect packets (protecting against the threat); and a change in available resources at the respective locations (e.g., part or all of the resources at a network component at one of the respective locations is not available due to maintenance or part due to being reassigned to a different task).

In some aspects, the techniques described herein relate to a method, further including: provisioning a first network function of the one or more network functions in a first network component and in a second network component, wherein the one or more data flows include a first data flow and a second data flow each passing through the first network component and the second network component; selectively applying, at the first network component, the first network function to the first data flow; and selectively applying, at the second network component, the first network function to the second data flow.

In some aspects, the techniques described herein relate to a method, wherein the first network component is at a first location of the respective locations, and the second network component is at a second location of the respective locations, which is different from the first location.

In some aspects, the techniques described herein relate to a method, wherein the first network component and the second network component are at a same location of the respective locations, the first network component includes first circuitry and the second network component includes second circuitry, and based on the analysis result, load balancing between the first circuitry and the second circuitry is performed by using the first circuitry to apply the first network function to the first data flow, and using the second circuitry to apply the first network function to the second data flow.

In some aspects, the techniques described herein relate to a method for intra-node load balancing, wherein a first network component, which is at a first location of the respective locations, includes first circuitry and second circuitry, based on the analysis result, load balancing between the first circuitry and the second circuitry is performed by: provisioning a first network function of the one or more network functions in the first circuitry and provisioning a second network function of the one or more network functions in the second circuitry, or provisioning the first circuitry to apply the one or more network functions to a first data flow of the one or more data flows and provisioning the second circuitry to apply the one or more network functions to a second data flow of the one or more data flows.

In some aspects, the techniques described herein relate to a method, wherein the first circuitry is a CPU or a network processor, and the second circuitry is a DPU or a GPU having accelerator hardware.

In some aspects, the techniques described herein relate to a method, wherein a controller of the first network component analyzes the values of the performance metric and the network-function metric to generate the analysis result, and the controller selects how to achieve load balancing between the first circuitry and the second circuitry.

In some aspects, the techniques described herein relate to a method for inter-node load balancing, wherein a central controller receives information from the respective locations and used the information to determine the values of the performance metric from the respective locations; the central controller analyzes the values of the performance metric and the network-function metric to generate an analysis result; and the central controller selects the one or more selected locations based on the analysis result.

In some aspects, the techniques described herein relate to a method, wherein the information received by the central controller is the values of the performance metric from the respective locations.

In some aspects, the techniques described herein relate to a method, wherein the information received by the central controller provides visibility into an ecosystem of the network.

In some aspects, the techniques described herein relate to a method, wherein the one or more network functions apply security services to the one or more data flows, the central controller selects, for each location and a given network component at a location, which NF of the one or more network functions is applied and to which data flow of the one or more data flows the selected NF at the location is applied, and, for the given network component at the location, the NF applied and the data flow to which the NF is applied are selected based on minimizing duplication of security services applied to the one or more data flows.

In some aspects, the techniques described herein relate to a method, wherein the NF applied and the data flow to which the NF is applied are further selected based on load balancing usage of available computational resources among the respective locations of the network.

In some aspects, the techniques described herein relate to a method, wherein load balancing the usage is achieved by: selecting a first location of the respective locations that has more available computational capacity/resources than a second location to perform a first network function of the one or more network functions that consumes more computational capacity/resources than a second network function; and selecting the second location to perform the second network function.

In some aspects, the techniques described herein relate to a method, wherein load balancing the usage is achieved by: performing a first network function of the one or more network functions at a first location and at a second location of the respective locations, wherein the first location has more computational capacity/resources than the second location; and performing, at the first location, the first network function on a first data flow of the one or more data flows; and performing, at the second location, the first network function on a second data flow of the one or more data flows, wherein the first location is selected to perform the first network function on the first data flow because the first location has more available computational capacity/resources than the second location, and performing the first network function on the first data flow consumes more computational resources than performing the first network function on the second data flow.

In some aspects, the techniques described herein relate to a method, wherein the NF applied and the data flow to which the NF is applied are further selected based on which network components include circuitry that is at least partially specialized for at least one of the one or more network functions.

In some aspects, the techniques described herein relate to a method, wherein the NF applied and the data flow to which the NF is applied are further selected based on relative improvements in computational efficiency with respect to which network components perform which of the one or more network functions.

In some aspects, the techniques described herein relate to a method, wherein the one or more network functions include a first network function and a second network function, the first network function being configured such that, when provisioned in a DPU, the first network function leverage specialized circuitry in the DPU, and the second network function, when provisioned in the DPU, is not configured to leverage the specialized circuitry in the DPU, and the method further includes selecting a first location of the respective locations that includes the DPU to perform the first network function, and selecting a second location of the respective locations to perform the second network function.

In some aspects, the techniques described herein relate to a method, further including: determining, at a controller at one of the respective locations, the values of the network-function metric and the performance metric corresponding to the one of the respective locations; receiving, at the controller, metadata and/or communications, from one or more other locations of the respective locations; and determining, by the controller, the values of the network-function metric and/or the performance metric corresponding to the one or more other locations of the respective locations; analyzing, by the controller, the values of the performance metric and the network-function metric to generate an analysis result; and selecting, at the controller, a first network function of the one or more network functions to perform at the one of the respective locations.

In some aspects, the techniques described herein relate to a method, wherein the metadata is included in a header of data packets of the one or more data flows, and the metadata includes information representing prior NFs, wherein the prior NFs are network functions performed on the one or more data flows prior to processing at the one of the respective locations.

In some aspects, the techniques described herein relate to a method, wherein the metadata and/or information provides visibility into a network ecosystem around the one of the respective locations.

In some aspects, the techniques described herein relate to a method, further including: communicating, from the one of the respective locations, a selection of the first network function to one or more other locations of the respective locations; performing, at the the one of the respective locations, the first network function on the one or more data flows; and coordinating, between the one of the respective locations and the one or more other locations of the respective locations, changes regarding which of the one or more network functions are performed at the the one of the respective locations and which of the one or more network functions are performed at the one or more other locations of the respective locations.

In some aspects, the techniques described herein relate to a method, further including: processing the one or more data flows at a given node or the network at one of the respective locations, the given node including a controller and a data plane; determining, at the controller, the values of the network-function metric being based on security services provided by prior NFs performed at prior locations through which the one or more data flows were processed before being processed by the data plane; determining, at the controller, the values of the performance metric corresponding to computational resources available, at the data plane, for performing the one or more network functions; and selecting, at the controller, a selected NF of the one or more network functions to perform in the data plane, the selected NF being selected based on the values of the network-function metric and the performance metric, such that the selected NF does not duplicate the security services provided by the prior NFs and the performing the selected NF in the data plane does not exceed the computational resources available at the data plane.

In some aspects, the techniques described herein relate to a computing apparatus including: a processor; and a memory storing instructions that, when executed by the processor, configure the apparatus to perform a method according to any of the above aspects.

In some aspects, the techniques described herein relate to a computing apparatus including: a processor; and a memory storing instructions that, when executed by the processor, configure the apparatus to: determine values of a performance metric at respective locations within a network; determine values of a NF metric for one or more network functions that process one or more data flows within the network; analyze the values of the performance metric and the network-function metric to generate an analysis result; select, from the respective locations and based on the analysis result, one or more selected locations within the network to perform the one or more network functions; and perform, at the one or more selected locations, the one or more network functions on the one or more data flows.

In some aspects, the techniques described herein relate to a non-transitory computer-readable storage medium, the computer-readable storage medium including instructions that when executed by a computer, cause the computer to perform a method according to any of the above aspects.

In some aspects, the techniques described herein relate to a non-transitory computer-readable storage medium, the computer-readable storage medium including instructions that when executed by a computer, cause the computer to: determine values of a performance metric at respective locations within a network; determine values of a NF metric for one or more network functions that process one or more data flows within the network; analyze the values of the performance metric and the network-function metric to generate an analysis result; select, from the respective locations and based on the analysis result, one or more selected locations within the network to perform the one or more network functions; and perform, at the one or more selected locations, the one or more network functions on the one or more data flows.

Example Embodiments

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for more efficient and effective placement of security services and/or network functions among the nodes of a network. According to certain non-limiting examples, the security services and/or network functions can be placed at different nodes and at different network components within distributed security systems and firewalls.

Many of the security services and/or network functions can be provisioned in the network components/devices as serverless network security functions. For example, the serverless network security functions can be implemented at respective nodes in the network using a DPU or other hardware offload technology (e.g., an ASIC, an FPGA, etc.). The serverless network security functions can be provisioned in the network without a container, a VM, or a switch by directly in-lining the functionality into a hardware component using a serverless API call by a central controller or can be run directly on the hardware subsystem. The serverless API call can instantiate the inline network function by causing an API backend to deploy a selected program from a group of programs. Further, the selected program can be selected based on a target network component at the selected location into which the inline network function is to be provisioned. For example, if the target is a CPU, then the network function can be provisioned using an eBPF program configured to be executed on host CPUs or a P4 program configured to be executed on the CPUs. If the target is a DPU, then the network function can be provisioned using an eBPF program configured to be executed on DPUs or as a P4 program configured to be executed on the DPUs. If the target is a switch, then the network function can be provisioned using an eBPF program configured to be executed on switches or a P4 program configured to be executed on switches. If the target is an ASIC, then the network function can be provisioned using a program configuring an ASIC application-specific. If the target is an FPGA, then the network function can be provisioned using a program configuring an FPGA.

The use of serverless network security functions to perform the security services and/or network functions can improve the flexibility, agility, and adaptability of the network by allowing a greater selection of where they can be placed and increasing the case with which the security services and/or network functions can be moved to a different location within the network to adapt to changes in the network (e.g., changes in computational demands throughout the network and/or changes network access patterns).

In certain examples, the selection of where to place the security services and/or network functions can be influenced by the relative availability of computational resources at the nodes and network components, the relative advantages of computational hardware at the respective nodes and network components (e.g., DPUs can have accelerators, which are specialized hardware for more efficiently performing certain security services and/or network functions), and the relative advantages performing the security services and/or network functions at particular locations. These relative advantages can be captured and expressed in various scores, such as a performance metric and/or an NF metric.

According to certain non-limiting examples, the performance metric can capture, e.g., the availability of computational resources at the nodes and network components of the network. Additionally or alternatively, the performance metric can capture indicia of data-flow bottlenecks at the respective nodes of the network. Such indicia of data-flow bottleneck can include, but are not limited to, the number or percentage of dropped pulses at a given node. Other indicators can include the packet latencies or the average packet latency through the given node.

According to certain non-limiting examples, the network-function metric can represent a quantity of computational resources consumed by the respective network functions. Additionally or alternatively, the network-function metric can include one or more values representing the benefits of performing a given security service or network functions at a particular node of the network. Additionally or alternatively, the network-function metric can represent a characteristic of the data flows through the respective of nodes in the network. An example of such a characteristic of the data flows can be the likelihood that the data flows at a given node include data packets that represent a threat against which the security services or network functions protect or remediate. For example, if the security service is a function in an intrusion detection prevention system that detects a certain threat signature. The network-function metric can represent the likelihood that the packets in the data flow would have that certain threat signature.

Additionally or alternatively, the NF metric can represent the efficacy of the security services or network functions at respective nodes in the network. For example, certain security services might be more effective when placed at the edge/boundary or the network, as in a traditional firewall, whereas others might be more effective when placed near the workload to thereby protect against both east-west traffic and north-south traffic.

Additionally or alternatively, certain security services might be more effective when placed in front of a certain type of workload, but be less effective when placed in front of other types of workloads (e.g., the security services to screen for Log 4J signatures would be more effective in front of Apache servers than in front of Windows servers). Further, relative to other data flows, a certain data flow from a particular source might pose a greater risk for a particular type of cyberattack, and thus those security services that protect against that particular type of cyberattack, which can be represented in the value of the network-function metric for that certain data flow and those security services that protect against that particular type of cyberattack. That is, the value of the network-function metric can be a function of the data flow, the security services and/or network functions, the node in the network, and the respective network components at that node (e.g., each node can have multiple network components and ways on provisioning security services and/or network functions to operate on data flows at the node, such as a CPU, applications running in the user space of the CPU, an eBPF running on the kernel of the CPU, a DPU, an accelerator running on the DPU, a host running on the DPU, and/or an eBPF running on the host of the DPU).

According to certain non-limiting examples, serverless network security functions are provisioned in a DPU or other hardware offload technology such as an ASIC or FPGA. The network security functions are implemented without a container, VM, or switch. Instead, the network security functions are directly in-lined into a hardware component using a serverless API call. The network security functions can be run directly on hardware subsystem (e.g., switching hardware or accelerators in a DPU).

According to certain non-limiting examples, the selection of where within the network (e.g., which node and which type of hardware) to provision the network security functions (or more generally network functions) can be done by a central controller. Additionally or alternatively, the process of selecting which network security functions are provisioned and where they are provisioned can be distributed across several local controllers (e.g., the control plane agents within respective network components/devices) across or can be run directly on the hardware subsystem. For example, the controller can optimally place the eBPF programs or P4 programs or other security programs or policies into a location (or network component) within the ecosystem that improves the overall performance of the network. Examples of such can include placing this in a DPU running in a ToR switch.

Where the network security functions are placed within the network presents trade-offs. For example, the placement of certain network security functions (e.g., DPI) in a ToR switch might create a bottleneck due to the large bandwidth of data packets being processed through the ToR switch compared to the relatively limited computational resources in the ToR switch, especially when the certain network security functions are particularly computationally intensive. More computationally intensive policies/processes might be more efficiently sub-divided so that different nodes apply to policies/processes to respective parts of the data flow (e.g., a subset of the /24 addresses). For example, the security services applied to a set of data flows that can be relatively computationally intensive can include DPI and filter based on IPS signatures, and anomaly detection. There can be advantages to performing these using a DPU offload, rather than in a CPU. For example, inline network functions can be dynamically provisioned on selected network devices at the respective locations. The selected network devices can be selected based on indicia of a benefit (e.g., the benefit can be an improvement in the security/protection, an improvement in efficiency, and improvement in throughput, a reduction in the number of dropped pulses, or a decrease in packet latency). Additionally or alternatively, the selected network devices can be selected based on indicia of available computational resources for performing the provisioned network functions at the selected network devices.

Further, various network functions can be more efficiently performed in a DPU than in a CPU. For example, when networks process data, the processes associated with both sending and receiving data flows can consume significant computational resources of the servers that are responsible for handling the network traffic. As the server is performing network operations, the computational resources on the CPUs of the servers are consumed and therefore not available to run the actual applications or process the data. This challenge can be addressed by using hardware offloading to transfer resource-intensive computational tasks from the server's CPU to a separate piece of hardware (e.g., a DPU).

Offloading some network protocols to the DPU can provide larger improvements than others. For example, some network protocols are relatively more expensive to implement than others, such as IPsec, used for authenticating and encrypting packets, and Geneve, used for managing overlay networks. These protocols can be completely moved from the server's CPU to a specialized piece of hardware called a DPU.

The DPU can include acceleration engines, which are specialized circuitry that is configured to accelerate specific tasks. Examples of the acceleration engines on a DPU can includes: (i) data packet parsing, matching, and manipulation (e.g., to implement an OVS); (ii) RDMA data transport acceleration for Zero Touch ROCE; (iii) TCP acceleration (e.g., RSS, LRO, and checksum); (iv) network virtualization for VXLAN and Geneve overlays and VTEP offload; (v) accelerators for traffic shaping "packet pacing" accelerator (e.g., to enable multimedia streaming, content distribution networks and the new 4K/8K Video over IP); (vi) precision timing accelerators for telco cloud RAN such as 5T for 5G capabilities; (vi) crypto acceleration for IPSec and TLS performed inline, so all other accelerations are still operational; (vii) virtualization support for SR-IOV, VirtIO and para-virtualization; (viii) Secure Isolation: root of trust, secure boot, secure firmware upgrades, and authenticated containers and application lifecycle management; and (ix) accelerators to bypass the CPU and feed networked data directly to GPUs.

Additionally, performing certain security and network functions on a DPU rather than on a CPU can improve system performance because DPUs can provide isolation in addition to providing acceleration and offloading. That is, the DPU can offload, accelerate, and isolate infrastructure workloads. For example, the DPU provides offloading by taking over infrastructure tasks from the server CPU so more CPU power can be used to run applications. The DPU provides acceleration because using hardware acceleration in the DPU silicon, the DPU can run infrastructure functions more quickly than the CPU. The DPU provides isolation by moving various data plane and control plane functions to a separate domain on the DPU. This has the benefits of freeing up computational resources on the server CPU and protecting the functions in case the CPU becomes compromised.

Compared to server CPUs, the DPU's CPU cores can provide benefits for running control plane or security workloads that are isolated from the server's application and OS domain.

Further, in the non-limiting example of a bare metal server, it can be advantageous to avoid hypervisors and/or VMs from running on the bare metal server to eliminate remote management, telemetry, or security because such remote management, telemetry, or security can hurt performance and may interfere with the applications on the bare metal server. However, it is also beneficial to preserve the ability to monitor the server's performance and detect, block, or isolate security threats if they invade that server. A DPU can run this software in isolation from the application domain, providing security and control without interfering with the server's performance or operations.

According to certain non-limiting examples, there can be advantages to implementing certain security services immediately in front of a server/workload (e.g., to protect the workload against east-west type of vulnerability). In some networks, there may be traffic that does not pass through firewalls located at the edge/boundary of the network. For example, consider a hardware appliance in a rack in your data center that is hair-pinning traffic through the hardware appliance. In this case, it is not guaranteed that all the traffic is going through the firewall at the edge network. Further, there can be east-west paths between workloads that never pass through such a firewall.

According to certain non-limiting examples, there can be advantages to implementing certain security services at the edge/boundary where data enters a trusted network (e.g., a traditional firewall. Such a firewall ensures that all data entering the network has undergone certain security services.

According to certain non-limiting examples, different layers or nodes within the network can be associated with different layers of the OSI model. According to certain non-limiting examples, the access layer of a data center can include L2 network components/devices (e.g., devices that work on layers 1 and 2 of the OSI model). According to this same example, the aggregation layer of the data center can include L3 network components/devices (e.g., devices that work on layers 2 and 3 of the OSI model), and the data center core can include L4 network components/devices (e.g., devices that work on layers 3 and 4 of the OSI model).

According to certain non-limiting examples, network/security functions can associated with one or more layers of the OSI model, and therefore might be more naturally placed in a data center layer where that type of processing is being performed. Examples of network/security functions L2 (i.e., the data link layer) can include, e.g., processing the MAC layer and LLC layer layers for IEEE network standards. Examples of network/security functions L3 (i.e., the network layer) can include, e.g., routing protocols, multicast group management, network-layer information and error, and network-layer address assignment. Examples of network/security functions L4 (i.e., the transport layer) can include, e.g., the TCP and the UDP of the Internet Protocol Suite. Examples of network/security functions L7 (i.e., the application layer) can include, e.g., file sharing, message handling, and database access.

According to certain non-limiting examples, the security service chain for a given data flow can include a WAF function, an L3 firewall function, and an L7 firewall function. A controller can select which network components along the path of the given data flow perform which of these functions. For example, a network component that is doing other L3 processing (e.g., a DPU in the aggregation layer) might provisioned and tasked to perform the L3 firewall function, whereas a network component that is doing other L7 processing (e.g., an eBPF running on a CPU in an application server) might be provisioned and tasked to perform the L7 firewall function. The value of the network-function metric can represent the relative advantages and/or of implementing a security service/function that corresponds to a given OSI layer in a network component that is performing other operations at the given OSI layer.

According to certain non-limiting examples, different security services can be advantageously implemented at different nodes within a network. For example, there can be advantages to implementing a second set of security services at the initial boundary to the trusted network.

According to certain non-limiting examples, some security functions are better implemented in a DPU to take advantage of hardware accelerators in the DPU, whereas other security functions are better implemented in an eBPF to leverage the particular functionality of the eBPF, access to the host and/or kernel space.

According to certain non-limiting examples, some types of protections are more feasible to implement at different OSI levels. Further, different types of hardware can be better optimized for different types of analyses and threat processing. Dedicated hardware with accelerators (e.g., specialized processors) might be better for certain types of high-speed repetitive processing (e.g., de-duplication comparing hash functions of data packets), but the dedicated hardware might be at a place within the network where access to certain types of information are inaccessible (e.g., hardware processing OSI layer 2 might not have access to the payloads of encrypted packets).

FIG. 1 illustrates an example system 100 for the systems and methods disclosed herein in which security services, network security functions and/or network functions (generally referred to as network functions) are provisioned at various locations (e.g., nodes) within a network. Many of the network functions are implemented as serverless network security functions that are running on physical devices without being implemented in containers or VMs. For example, the serverless network security functions can be directly in-lined into a hardware component using a serverless API call. This can be realized by a controller determining optimal locations within the network ecosystem for the network functions, and then the controller can place the network functions at the optimal locations, e.g., by provisioning the network functions inline on hardware as a serverless network security functions (e.g., using an eBPF program or P4 program or other security function). For example, the serverless API call can be used to place the network function in a DPU that is running in a ToR switch, if that is determined to be the right location within the network ecosystem.

FIG. 1 illustrates processing data flows through respective nodes of a computer network. System 100 is illustrated using the non-limiting example in which controller 110 receives information from the nodes and determines where respective network functions are provisioned within the network ecosystem. For example, the nodes can communicate to the controller 110 the amount of available computational resources and the type of computational resources (e.g., whether the resources are in a CPU, a DPU, an accelerator in the DPU, etc.). Further, the nodes can communicate to the controller 110 various types of telemetry data and observability data, such as network access patterns of the data flows, the quantity/bandwidth of the data flows, characteristics of the data flows (e.g., source identities, frequency of cyber threat signatures, etc.). Controller 110 can be a central controller (or can be a controller located in one of the nodes) that evaluates the received information from the nodes, determines metric values from the received information, and determines optimal locations for one or more network functions based on the determined metrics.

For example, the metrics can include a performance metric and a network-function metric. According to certain non-limiting examples, the performance metric can represent the quantity of computational resources available at the respective locations. Additionally or alternatively, the performance metric can represent the types of computational resources available at the respective locations. Additionally or alternatively, the performance metric can represent the throughput capacities available at the respective location; and/or indicators of resource limits at the respective locations.

According to certain non-limiting examples, the network-function metric can represent a quantity of computational resources consumed by respective NFs of the one or more network functions. Additionally or alternatively, the network-function metric can represent the efficacies of the one or more network functions for respective data flows through the network. Additionally or alternatively, the network-function metric can represent the likelihoods that the data flows at the respective locations present a threat that the one or more NFs defend against.

Additionally or alternatively, decisions can be made using a distributed decision mechanism regarding where the respective network functions are provisioned within the network ecosystem. For example, the nodes can add metadata to the data flows informing subsequent/downstream nodes regarding the performance of the upstream nodes. This information can be communicated between nodes using in-band and/or out-of-band mechanisms. As in the above non-limiting example of a central controller, in the case of a distributed control mechanism, the information shared among the nodes can include performance information for the respective nodes (e.g., amounts and types of available computational resources at the respective nodes), data flow information (e.g., telemetry data and observability data), and network function information (e.g., attestations or other information regarding which network functions are currently being performed at which nodes). Based on the information received at a given node, a controller at that node can determine (independently or in coordination with the controllers at other nodes) which of the network functions can be optimally implemented at the given node.

According to certain non-limiting examples, the nodes can add both in-band and out-of-band metadata that provides context regarding the data flows and the nodes. For example, the in-band metadata can be added to headers of packets in the data flows (e.g., by adding the metadata in optional IPv6 extension headers). Further, the out-of-band metadata can be added to a ledger that can be accessed and written to by each of the nodes.

According to certain non-limiting examples, the in-band metadata can include attestations added to the optional extension headers (e.g., IPv6, TLS, or encapsulation header) of the data packets. These attestations can provide a secure mechanism for communicating what security functions and/ or policies have been applied to the data flow. Space limitations can prevent the packet headers from including a complete and fulsome description of all the security functions and/or policies. Accordingly, the attestations and information in the header can be used as an index to the ledger, which then provides the details regarding the security functions and/or policies that have been applied to the data flow.

Additionally or alternatively, in band and out-of-band metadata can record information regarding the availability of computation resources at the respective nodes.

As illustrated in FIG. 1, system 100 can include a first node 104 that processes data flow 102 to generate data flow 108, which can include in-band metadata generated at the first node 104. The first node 104 can also send out-of-band metadata to the controller 110. The in-band metadata and/or out-of-band metadata can include performance information, data flow information, and/or network function information, as discussed above. For example, data flow 108 can include processed data packets from data flow 102 that are being forwarded from the first node 104 to the second node 112, and these processed data packets can be modified to include various information regarding the computational capacity and the types processing performed at the first node 104.

The data flow 108 can then be processed by a second node 112, which generates a next data flow that includes additional in-band metadata generated at the second node 112 (e.g., attestations regarding which security processes and policies are performed by the second node 112). Further, the second node 112 can generate and send to the controller 110 out-of-band metadata, which can include performance information, data flow information, and/or network function information.

This process can repeated for as each of the nodes along a path through the network including the workload 118, which also can have computational capacity to perform one or more network functions on the data flows. Further, the workload 118 can generate out-of-band information, such as telemetry data, observability data, and audit data that can be useful from informing decisions by the controller 110.

According to certain non-limiting examples, the serverless network security functions can be network functions that are running on physical devices without containers or virtual machines (VMs). Previously, virtualization of the network functions (e.g., network functions virtualization (NFV) and/or virtual network functions (VNFs) can enable network functions to be moved to virtual machines (VMs) or containers. Containers and VMs are both virtualization technologies that can be used to deploy and manage applications, such as network functions. Containers and VMs have different strengths and weaknesses. Generally, containers are more lightweight and efficient than VMs, making them preferred for microservices-based applications. Containers can be more portable than VMs (e.g., can be easily moved from one environment to another), but containers do not provide as much isolation as VMs. VMs can be managed using traditional tools like Hypervisors, but use more resources than containers and are less portable.

Network functions virtualization (NFV) can be an architecture specifying how to run software-defined networking (SDN) functions independent of any specific hardware platform. NFV can be implemented as the infrastructure platform that orchestrates VNFs. VNFs can be individual network services (e.g., routers and firewalls) running as software-only VMs on generic hardware. For example, a routing VNF can implement all the functions of a router but runs in a software-only form, alone or along with other VNFs, on generic hardware. VNFs are administered and orchestrated within the NFV architecture.

Serverless network functions can depend on a bottom layer, rather than being implemented on generic hardware. For example, serverless network functions can be tied specifically to the data processing unit (DPU) in which case the serverless network functions are in-lined inside of a DPU, and the network functions are integrated with the serverless functionality.

According to certain non-limiting examples, the serverless network functions are enabled to run code without provisioning or managing servers. For example, the serverless network functions can be executed using a high-availability compute infrastructure and performs all of the administration of the compute resources, including server and operating system maintenance, capacity provisioning and automatic scaling, and logging.

According to certain non-limiting examples, the serverless network functions can be run on a DPU. The serverless network functions can be created for security and network use cases, such that they can be operationalized in the DPU to actually run in the DPU. The continuous integration and continuous deployment (CI/CD) pipeline can be integrated around provisioning, configuring, and utilizing the serverless network functions in hardware devices (e.g., DPUs) rather than in a generic computing processor (e.g., CPUs running an operating system). The serverless network functions can be realized using APIs provided by a given vendor. Utilizing the APIs, the serverless network functions can be dynamically created to provide security functions in the DPUs.

For example, the DPUs can be located on the front end of a network system to dynamically create the serverless network functions, thereby enabling a serverless nomenclature and wrapping it around the front of the DPU. This provides flexibility and agility to select and change which security and network functions should be placed at the front end of a network system. DPUs and other computing hardware that is capable of implementing the serverless network functions can also be located at other locations within the network, providing additional flexibility and agility to select and adapt where the network functions are implemented. For example, the selection of where the network functions are placed within the network can be continuously adapted based on evolving network access patterns to optimize the network performance for the current network access patterns.

According to certain non-limiting examples, serverless network functions can be used for cloud workloads by applying the serverless network functions to the DPUs in a cloud network.

According to certain non-limiting examples, in-lining the network functions inside of a DPU or CPU can be realized in different ways. For example, the function can be written in a way that it can be compiled into eBPF to run in kernel space (e.g., a packet is written out to the network). The system can generate a sideband channel with additional metadata that indicates information such as a new data flow has started from a given user. To execute the function in eBPF, the function is compiled into instructions that runs in eBPF. Additionally or alternatively, the network functions can in-lined at the CPU level, instead of doing it at the eBPF. Additionally or alternatively, the network functions can in-lined at a SmartNIC or the DPU. For example, the network functions can be translated into a configuration in accelerators or specialized hardware in the DPU or the network functions can be programmed to run in one of the cores that runs on the DPU (e.g., the core can be an ARM core). The network functions can be configured to run on different platforms, e.g., using multi-version coding, and then deciding which of the versions of code to deploy based on which location/device in the network is selected for deployment of the network functions.

According to certain non-limiting examples, network access patterns can be used to make decisions of which network functions (e.g., networking functions and security functions/policies) to implement in the network, where to implement them, which network components/devices to implement them in, and how to implement/provision them (e.g., in a container or VM on a CPU, in an eBPF on an ARM core of an DPU, as a serverless network function directly in-line on an accelerator in a DPU). Thus, the network functions can be dynamically created to provide networking functions, security functions, and/or observability functions based on network access patterns. Rather than preconfiguring network functions to provide these functions, the system observes network access patterns and/or characteristics of the data flows (e.g., a central controller receives telemetry and other network data, as illustrated in FIG. 1), and then the system instantiates/provisions these functions dynamically based on what the system has observed. For example, the system/network can be agile in determining what network functions are needed and where they can be optimally placed. By using serverless network functions in addition to container and VM based network functions, the system has greater flexibility in where to place the network functions and can improve system performance by leveraging hardware acceleration via specialized hardware for many network functions.

According to certain non-limiting examples, the system (e.g., a central controller or controllers distributed throughout the network) observes a data flow and/or packets within the data floes and, based on these observations, the system dynamically creates some functions based on the observed packets and/or data flows. The system can then operationalize/provision/instantiate the functions in the appropriate places (e.g., selected nodes and devices in said nodes to improve or optimize performance according to one or more metrics, e.g., security metrics, efficiency metrics, throughput metrics, etc.). For example, the functions can be operationalized in the distributed firewall or in various DPUs, depending on which place is determined to be the appropriate place to improve system performance. For example, the network functions can also be operationalized in an eBPF, when the system is configured to include eBPF agents. Rather than have a static configuration for security and network functions, the system can be dynamic such that the system dynamically adapts to network access patterns based on traffic observations on the network fabric to thereby provide and move network functions within the system based on observed flows.

For example, the system might observe a sequence of suspicious packets, and, based on these observations, the system can dynamically adapt by setting up an intrusion prevention system (IPS) in the workflow. Additionally or alternatively, the system can buffer the suspicious packets that were observed and replay them through the IPS.

According to certain non-limiting examples, the system can pick up the packet flow at that point in the flow where the suspicious behavior is recognized without attempting to retrospectively detect and prevent suspicious packets that have already passed through the given node. Further, the system can determine to prospectively prevent additional suspicious packets from getting through the given node. For example, the system can set up a new network function in place upon the system observing the suspicious packets to thereby dynamically start to the new network function to serve prospective packets. Additionally or alternatively, the system can also create remediation functions based the observations of suspicious packets. For example, the system can determine that what is being observed appears to a specific attack, and, based on the specific attack, the system can remediate all of the vulnerable servers in the data path that is being attacked based on observing the packets that look like the specific attack that acts a specific exploit.

According to certain non-limiting examples, the systems and methods disclosed herein provide control over where the network functions are placed within the network. For example, the network functions can be implemented using an eBPF, and eBPF programs can be provisioned in the processors or hosts at different locations throughout the network. The fact that the eBPFs can be provisioned at many different locations provides a great deal of flexibility in the decision of where in the network to place the network functions that are implemented via eBPF. For example, this decision can take into consideration such factors as available/unused computational capacity, where the network functions would provide the most benefit, and where there is specialized hardware that is adapted to more efficiently/quickly perform the network functions. For example, if the system puts a given function on a first DPU that is already be overloaded with other observability functions, then the system performance can be degraded, whereas placing the given function at another DPU that is not overloaded might not degrade the system performance.

According to certain non-limiting examples, the system can have an alternative path in place to operationalize the given functionality. For example, the system might have a chain of DPUs (e.g., five DPUs that are all in line with each other), and the first and second DPUs are already doing other security operations. Accordingly, placing the given functionality in the first and second DPUs could be suboptimal. For example, when the first and second DPUs are already at capacity, adding another network function could create a bottleneck, resulting in dropped packets or other problems. That is, a poor choice in where to place network functions could be computationally expensive because certain locations (e.g., nodes or devices) may lack additional capacity to accommodate the given functionality. In the non-limiting example above, the given functionality might be better operationalized in the third, fourth, or fifth DPU in the chain. The place where this functionality is operationalized can affect performance. Therefore, the system can be improved by operationalizing functions based on load or other criteria (e.g., other criteria might relate to aspects of the security service chain, such as which nodes are better configured for L3 versus L7 processing and whether there is a preferred order/location in which to perform the network functions, as discussed above). For example, a central controller can consider various factors, such as load and/or other criteria, when determining the optimal place for the network functions in the service chain.

According to certain non-limiting examples, there can be many different ways to realize/provision security/network functions. Consider the example in which the network function is a security function. As a first example, the system can run the security function on the server, i.e., as an application that runs on the CPU itself (e.g., the application runs in the user space of the CPU). Additionally or alternatively, the system can run the security function as a BPF program that is on the CPU such that the network function is executed as instructions in the kernel rather than the user space. Additionally or alternatively, the system can run the security function on a DPU (e.g., on a host in the DPU or in an accelerator of the DPU). Given all these options, the system can explore and determine the optimal place to execute the security function based on observing the CPU levels and memory usage across the host and across the DPUs. The system can optimally move and migrate the security functions around to take advantage of where would be the best place to run the security functions. Additionally or alternatively, this decision can depend on workload placement as well. For example, there can be benefits to placing the security function in hardware that is near the workload that is being monitored. Additionally or alternatively, the system might take into account the advantages of isolating a function that is suspected to be susceptible to a security issue (e.g., a known vulnerability or exploit). Further, the system can be dynamically adapted. For example, when a vulnerability in a first workload/server is tied to the function of a VM and that VM is moved to a second workload/server due to load balancing, then it would be beneficial to migrate security functions related to that vulnerability to network pathways in front of the another workload/server. For example, the system can migrate the security function from a first DPU in front of the first workload/server to a second DPU in front of the second workload/server.

Consider the non-limiting example of a service chain of security functions. Originally, the security functions can be running on respective CPUs of a first set of servers on the network. That is, the system is sending data flows through those security functions, and the system is performing within desired parameters and specifications. Then, the volume of traffic increases in the data flows through the network, resulting in a corresponding increase in the usage of computational resources of the CPUs of a first set of servers. This increase in usage can exceed the available resources degrading system performance (e.g., dropped packets, increased packet latency, etc.) To address this increased usage, the system could migrate the security functions from the CPUs to one or more DPUs or the system could migrate the security functions to different hosts. Additionally or alternatively, the system could migrate one or more of the security functions from the user space of the CPUs to instead be performed in eBPF on the CPUs. The systems and methods disclosed herein can use a holistic approach to examine all of the elements/options, and then find the best place to migrate these security functions to optimally utilize the available hardware in the network.

According to certain non-limiting examples, the system evaluates the conditions of the network ecosystem to determine where and how to operationalize the security and/or networking functions in the most optimal location. For example, if a server has ten CPUs and only one of the ten CPUS is being used, the system can determine to operationalize the security and/or networking functions in the remaining nine CPUs due to the low utilization of the CPUS. Additionally or alternatively, the system can determine to place the security and/or networking functions in a DPU that is not being used in that service chain path. In an example, the system can have a first DPU doing a first function in a given path and a second DPU doing a second function in the given path. When a third function is to be implemented in the given path and a third DPU is in the given path is only doing basic networking, the system might determine that the optimal place for the third security function is in the third DPU because it has the most available computational capacity.

According to certain non-limiting examples, the systems and methods disclosed herein can improve the provisioning of VNFs. As discussed above, VNFs can be virtualized through VMs or containers that are deployed to virtual or physical machines. The systems and methods disclosed herein further extend the concept of virtualization to include in-lined network functions, eBPFs, and serverless network functions. Thus, the network functions can be placed at more points of deployment along a communication/data path. For example, placing a network function in an eBPF allows the network function to be placed in the kernel that is observing a process. For example, the network function can be deployed by a control plane that executes instructions to provide a virtual network function as part of the OS. Because the network function is running in the kernel, it can be deployed without running in a container or a virtual machine. Accordingly, the network function is essentially running as part of the network flow implemented in the kernel position. In addition to using eBPFs, the network functions can also be virtualized in a way that exploits hardware acceleration provided specialized networking hardware, such as a SmartNIC or DPU. The systems and methods disclosed herein can include controllers having an awareness of the of the deployment, topology, and architecture of the network that enables the controllers to improve performance of the network through the choice of where to place network function. Further, by using serverless network functions, the expense of spinning up a new container or spinning up a new VM can be avoided. Rather than using a container or VM, the network functions can be deployed such that it runs natively on hardware such as a DPU without any shimming on the DPU. The serverless network functions can be deployed using either eBPF programs or programs that execute on DPUs, for example. In addition to these two non-limiting examples, the systems and methods disclosed herein can be applied using other mechanism for rendering a network function without deploying the network function inside a container or VM.

According to certain non-limiting examples, the systems and methods disclosed herein execute the same security functions that would otherwise be performed via an application on a server, For example, but, instead of running as applications on the server, the same security functions are operationalized in a hardware component (e.g., specialized circuitry optimized for the security functions), which provides higher throughput and bandwidth while still being able to facilitate the specific security functions. Examples of hardware components having specialized circuitry can include, e.g., ASICs, FPGAs, DPUs, and network switches.

According to certain non-limiting examples, the controller in the network receives observability data from respective components/nodes along the network, thereby enabling the controller to determine where is the most appropriate place to deploy the network functions. For example, the data received by the controller alerts the controller to which devices are present at respective nodes and their available resources (e.g., memory and computational capacity available on said devices).

According to certain non-limiting examples, a controller can be used to avoid performing redundant security functions on the same data flows. For example, a network path can include two switches, and the packets in the data flows traverse the two switches. It would be inefficient to repeat the same security functions on the same packets in both switches (e.g., screening the packets to detect the same cyber threat signatures). One strategy to efficiently use the available hardware on the two switches is to perform different security functions on the respective switches. Another strategy is to achieve load balancing by applying the security function to a different packets in the respective switches. For example, the same security functions can be applied on both switches, but in the first switch the security functions are applied to a first set of five-tuple flows (referred to as the first data flows), and, in the second switch, the security functions are applied to a second set of five-tuple flows (referred to as the second data flows).

In the above example, the first and second switches can be any hardware at respective nodes. That is the use of switches as illustrative hardware is non-limiting, and the example could use DPUs, CPUs, or other hardware to perform the security functions. The hardware at the respective nodes can be different types of hardware (e.g., the first node can have a switch and the second node can have a DPU to implement the security functions).

Additionally or alternatively, multiple hardware devices/components can be located at the same node of the network. For example, a node can include a CPU and a DPU offload, and the packets in the data flows traverse both the CPU and DPU. It would be inefficient to repeat the same security functions on the same packets in both the CPU and DPU (e.g., screening the packets to detect the same cyber threat signatures). One strategy to efficiently use the available hardware on the CPU and DPU is to perform different security functions on the respective processors. Another strategy is to achieve load balancing by applying the security function to a different packets in the respective devices. For example, the same security functions can be applied on both the CPU and DPU, but an application running on the CPU applies the security functions to the first set of five-tuple flows (i.e., the first data flows), and, in-lined instructions deployed in the DPU apply the security functions to the second set of five-tuple flows (i.e., the second data flows).

According to certain non-limiting examples, the controller is implemented in the control plane and security functions/policies are in-lined in the data plane. For example, the controller can be internal to a switch system that includes a NPU and a DPU. That is, the switch system includes a control plane element that configures the network flow, and the switch system can include a data path having several data planes (e.g., a data plane in the NPU and one or more data planes in the DPU), which are the hardware or software elements that do hop-to-hop processing. For an in-line flow like Internet protocol security (IPSec), an unencrypted packet can arrive on a NIC or network port. Based on information in the data flows, the control plane retrieves relevant information (e.g., by parsing the information in the packet headers) to determine the appropriate control information used to set up the switch system and to program the data plane. In the non-limiting example of IPSec processing, much of the processing can be offloaded to a DPU. The switching system can have two places (e.g., data planes) for handling the encryption—one data plane inside the NPU and another data plane in the DPU. The data plane in the NPU may have limited capacity. Nevertheless, some of the data flows (e.g., higher demand flows) can be processed through the NPU. The controller planes might choose to offload the remaining data flows to be processed in the data plane of the DPU.

Figure 2:
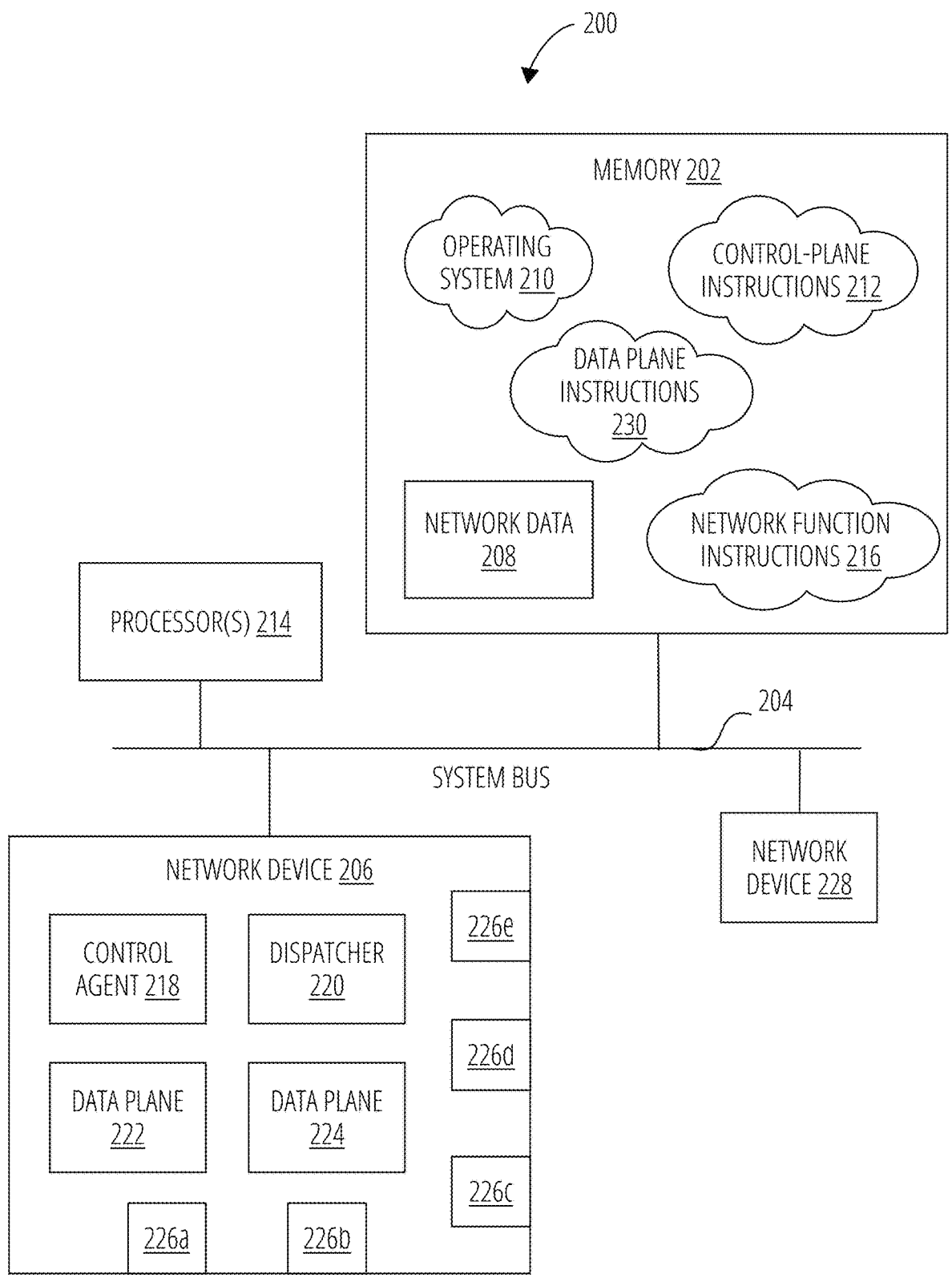
FIG. 2 illustrates a block diagram of an example of a network device, in accordance with certain embodiments.

FIG. 2 is a schematic block diagram of an example device 200 (e.g., a switch, server, CPU, DPU, or combination thereof) that may be used with one or more embodiments described herein. The device 200 may also be any other suitable type of device depending upon the type of network architecture in place. For example, the device 200 can be a network component at a node in a communication network, a node in a data center network, a node in a WiFi network, or an Internet of things (IoT) node. Device 200 can include network device 206, network device 228, and one or more processor(s) 214, and a memory 202 interconnected by a system bus 204.

The network device 206 can include the mechanical, electrical, and signaling circuitry for communicating data over physical links coupled to a network. The network device 206 can be configured to transmit and/or receive data using a variety of different communication protocols. the network device 206 can also be used to implement one or more virtual network interfaces, such as for VPN access, known to those skilled in the art. The network device 206 can be implemented as software instructions executed on a CPU, on a VM, on a BPF or eBPF that is configured to implement a network policy or function, for example. Alternatively or additionally, the network device 206 can be implemented as a separate piece of hardware (e.g., a DPU, a GPU, a SmartNIC, a network interface controller, an ASIC, an FPGA, or other device/circuitry configured to perform the function of a network component).

The network device 206 can be configured to provide one or more network functions, including, e.g., data-packet filtering, load balancing, packet screening, pattern detection for cybersecurity threats, malware detection, firewall protection, data-packet routing, data-packet switching, data-packet forwarding, computing header checksums, or implementing network policies. The network device 206 can include (or be part of) a SD-WAN appliance, a firewall, or a load balancer, for example.

The network device 206 can include a data plane, a control plane, and a management plane, as discussed below. Further, control-plane instructions 212 implementing the control plane and the management plane can be stored and/or in the memory 202 and executed in the processor(s) 214. Additionally or alternatively, the network device 206 can include processors or circuits that implement one or more functions of the control plane and the management plane. The network device 206 can include a series of ports (e.g., port 226a, port 226b, port 226c, port 226d, and port 226e). The network device 206 can also include a control agent 218, a dispatcher 220, a data plane 222, and a data plane 224.

Memory 202 can include a plurality of storage locations that are addressable by the processor(s) 214 and the network device 206 for storing software programs and data structures associated with the embodiments described herein. Memory 202 can include network data 208 and can include instructions for executing operating system 210, control-plane instructions 212, network function instructions 216, and data plane instructions 230. The processor(s) 214 can include logic adapted to execute the software programs and manipulate the network data 208. An operating system 210 (e.g., the Internetworking Operating System, or IOS®, of Cisco Systems, Inc., another operating system, etc.), portions of which can be in memory 202 and executed by the processor(s), functionally organizes the node by, inter alia, invoking network operations in support of software processors and/or services executing on the device.

Network device 206 and network device 228 can be configured to execute network functions, such as serverless network security functions that are in-lined in hardware. The processor(s) 214 can include a controller that determines where to provision the network functions, e.g., at which locations/nodes within the network, in which of the available network devices to provision the network functions, and/or how to provision the network functions (e.g., when the network device/component is a DPU, whether to provision the in-line in an accelerator of the DPU, in an ARM core of the DPU, in an eBPF in the ARM core, a P4 program, etc.) Additionally or alternatively, the controller can be a central controller that is located remotely from device 200.

According to certain non-limiting examples, device 200 can include the following three planes: (i) the dataplane, which processes the transit traffic; (ii) the control plane, which sends and receives control signals to monitor and control the transit traffic; and (iii) the management plane, which interacts with the user or the network management system (NMS).

Consider, For example, the operation of a router as an illustrative network edge device. Interfaces, IP subnets, and routing protocols can be configured through management plane protocols, including, e.g., a CLI, NETCONF, and/or a northbound REST API. The router runs control plane routing protocols (e.g., OSPF, EIGRP, BGP, etc.) to discover adjacent devices and the overall network topology, or to discover reachability information in case of distance/path vector protocols). The router inserts the results of the control-plane protocols into RIB and FIB. The dataplane software or ASICs, e.g., then use the FIB structures to forward the transit traffic. The management plane protocols (e.g., SNMP) can then be used to monitor the device operation, its performance, interface counters, etc.

Continuing with the non-limiting example of device 200 being a router, in addition to controlling the routing protocols, the control plane protocols can also perform numerous other functions including: (i) interface state management (e.g., PPP, TCP, and LACP); (ii) connectivity management (e.g., BFD, CFM, etc.); (iii) adjacent device discovery (e.g., "hello" mechanisms present in most routing protocols, such as, ES-IS, ARP, IPv6 NDP, UPnP SSDP, etc.); (iv) topology or reachability information exchange (IPv6 routing protocols, IS-IS in TRILL and SPB, STP, etc.); and (v) service provisioning (e.g., RSVP for IntServ or TE based on MPLS, uPNP SOAP calls, etc.).

Still continuing with the non-limiting example of device 200 being a router, in addition to forwarding packets, the dataplane can also perform the following functions: (i) NAT) session creation and NAT table maintenance; (ii) neighbor address gleaning (e.g., dynamic MAC address learning in bridging, IPv6 SAVI, etc.); (iii) NetFlow or sFlow accounting; (iv) network ACL logging; and (v) Error signaling, such as ICMP.

According to certain non-limiting examples, device 200 can perform various network functions including, but not limited to, data-packet filtering, load balancing, security screening, malware detection, firewall protection, data-packet routing, data-packet switching, data-packet forwarding, computing header checksums, or implementing network policies. Security screening can include, but is not limited to, deep packet inspections, analysis of behavioral graphs for detection of cyberattacks and/or malicious software, anomaly detection, cyber-attack signature detection, packet filtering, intrusion prevention systems, extended detection and response, endpoint detection and response, and/or network detection and response functions.

According to certain non-limiting examples, the management and control planes can be implemented in a CPU or in a DPU. According to certain non-limiting examples, the data plane could be implemented in numerous ways, including, e.g.: (i) as optimized code running on the same CPU as the control plane; (ii) as code running on a dedicated CPU core (e.g., a dedicated CPU for high-speed packet switching, such as a Linux server); (iii) as code running on linecard CPUs (e.g., a router); (iv) as dedicated processors (e.g., NPUs, DPUs, SmartNICs, etc.); and (v) as switching hardware (e.g., ASICs, FPGAs, etc.); and (vi) as switching hardware on numerous linecards.

According to certain non-limiting examples, the dataplane receives and processes the ingress packets. Further, the dataplane can selectively forward packets destined for the router (e.g., SSH traffic or routing protocol updates) or packets that need special processing (e.g., IP datagrams with IP options or IP datagrams that have exceeded their TTL) to the control plane.

According to certain non-limiting examples, the management ports on some devices (e.g. data center switches) can be connected directly to a control-plane CPU and thus bypass a switching ASIC.

According to certain non-limiting examples, the control plane can pass outbound packets to the dataplane, or use its own forwarding mechanisms to determine the outgoing interface and the next-hop router (e.g., when using the local policy routing).

Figure 3:
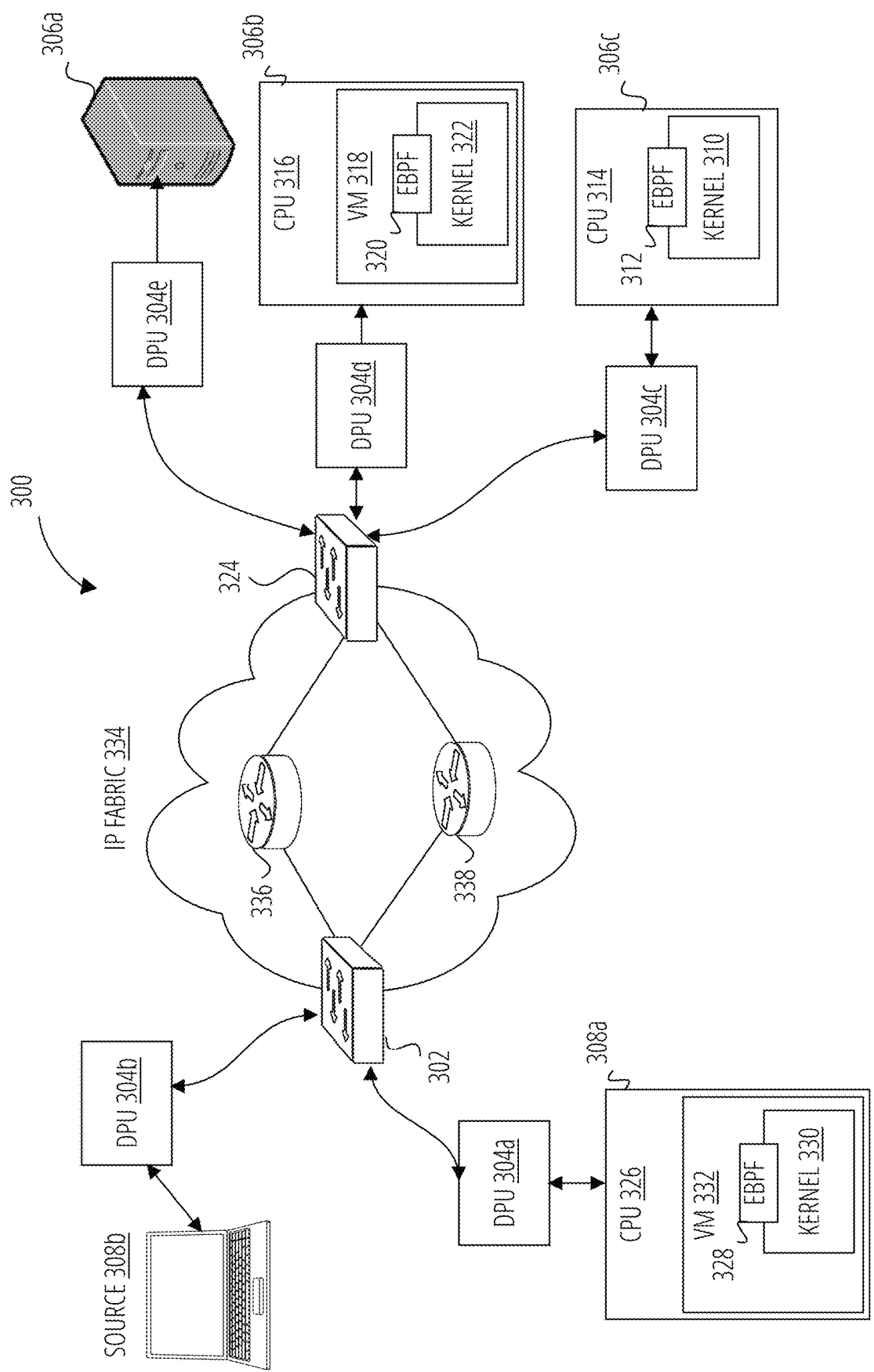
FIG. 3 illustrates a block diagram of an example of a subsystem of a net work that includes DPUs and eBPFs that perform various network functions, in accordance with some embodiments.

FIG. 3 illustrates a system 300, which is an example of a portion of a network (e.g., internet edge security framework 900 or data center 1000 or an e-commerce platform). System 300 provides an example of how network functions can be placed at different locations/nodes within the network and within different network devices/components to enable flexibility and agility to adapt to evolving network access patterns and cyber threats. System 300 can include various sources of data (e.g., source 308a and source 308b) which transmit the data via the IP fabric 334 to one or more destinations (e.g., destination 306a, destination 306b, and destination 306c).

Source 308a can include a CPU 326 on which a virtual machine (i.e. VM 332) is running, and VM 332 can include a kernel 330 that is accessed via eBPF 3286

Destination 306b can include a CPU 316 on which a virtual machine (i.e. VM 318) is running, and VM 318 can include a kernel 322 that is accessed via eBPF 320. destination 306c can include a CPU 314 that has a kernel 310 and an eBPF 312. Any of the DPUs, switches, routers, and hosts on DPUs (which can include ePBFs) can operate network nodes.

According to certain non-limiting examples, the data can be generated by an application running on VM 332, which is on the CPU 326 of source 308a. An eBPF 328 on the VM 332 observes the operations of the application, including, e.g., system calls and other interactions with the kernel 330. Generally, the eBPF 328 can provide observability information at the application layer of the open systems interconnection (OSI) hierarchy. The application can be part of a cloud-based application that includes software installed on a user device (e.g., source 308a) and includes software installed on a server (e.g., destination 306b). User interactions at the source endpoint generate data that is then sent to the destination endpoint where additional actions are taken on the data.

For example, the application can be a JAVA application running in VM 332, and the application is performing some business logic in which the application reaches out to a database to use some information that is read from the database to perform the business logic. The eBPF program (e.g., eBPF 328) can monitor the execution of the application, noting observations/information such as the user ID, the application ID, and that the application retrieved information from a given database (other examples of the noted observations/information are provided below). The application generates a data flow that includes the noted observations as metadata (e.g., included in-band in IP packet headers). Along the path (e.g., at the nodes along the path or at the destination) the data flow ends up going through a firewall (or some sort of other filtering technology). The firewall can then look at the metadata of the data flow, and based on the noted observations in the metadata, the firewall can apply selected security processes and/or policies, pass the data flow through the firewall, or drop the data flow, for example. Further, a controller can receive network data (e.g., telemetry data, program traces, etc.) from the nodes in the network and select which network functions to provision within the data path and where the selected network functions are to be provisioned along the data path. For example, the controller can determine that the network functions performed along the data path from VM 332 to VM 318 include performing a web application firewall (WAF) function, an L3 firewall function, and an L7 firewall function. Further, the controller can determine to provision the WAF function in switch 324 for the first set of data flows and a DPU offload to DPU 304d to perform the WAF function for a second set of data flows (e.g., all data flows except the first set of data flows). Further, the controller to determine that the L3 firewall function are provisioned in DPU 304d and the L7 firewall function are provisioned in eBPF 320.

The eBPF program (e.g., eBPF 328) can monitor the execution of the application, noting information such as: (i) the device (e.g., the endpoint, irrespective of its location); (ii) the user (e.g., the one logged into the endpoint); (iii) the application (e.g., what generates the traffic); (iv) the location (e.g., the network location the traffic was generated on); and/or (v) the destination (e.g., the FQDN to which this traffic was intended). This information for the data flows can be reported to the controller and be used in determining which network functions to provision along the data path. This information can be conveyed as metadata that is either in band (e.g., travels with the data flow, such as in packet headers) or out of band (e.g., in an overlay network). For example, an application that generates the data flow can run on one of the sources (e.g., source 308a or source 308b). Metadata can be generated and added to the data flow by the eBPF 328 on the VM 332, which is executed by the CPU 326 of the source 308a. Additionally or alternatively, an eBPF program can operate on the CPU 326. The data flow can go from the source through the IP fabric 334, which can include switch 302, switch 324, router 336, and router 338. As discussed above, the DPUS (e.g., DPU 304a, DPU 304b, DPU 304c, DPU 304d, and DPU 304c) switches (e.g., switch 302 and switch 324) and routers (e.g., router 336 and router 338 in IP fabric 334) along the data path can perform various networking functions. These DPUs can also add additional metadata to the packets (e.g., the encapsulated packets sent via a virtual network) based on observations made at the DPUs.

Metadata that is added to the optional headers or optional fields of the data flows at the source can be read from the data flows at subsequent nodes, which can use that data to determine what network functions (e.g., security services) have already been applied to the data flow, and based on this information a local controller at that node can determine next actions taken on the received data flows (e.g., which network functions should be applied at the current node). For example, for destination 306a, the DPU 304e can read the additional metadata applied by a DPU at the source (e.g., DPU 304a), and the additional metadata can inform a determination of processing steps at DPU 304c, or the additional metadata can be passed along to the destination 306a to inform processing that occurs there.

Similarly, for destination 306b, the DPU 304d can read the additional metadata applied by a DPU at the source (e.g., DPU 304a), and the additional metadata can inform a determination of processing steps at DPU 304d, or the additional metadata can be passed along to the destination 306a to inform processing that occurs there. Additionally, the eBPF 320 can read metadata generated by eBPF 328, which is encoded, e.g., on a header of the IP packets. The additional metadata from DPU 304a and the metadata from eBPF 328 can be used together (e.g., correlated) to inform processing steps performed at VM 318 and/or in kernel 322.

For destination 306c, the application can run directly on the CPU (i.e., CPU 314) rather than on a VM that is running on the CPU. For destination 306c, the DPU 304c can read the additional metadata applied by a DPU at the source (e.g., DPU 304a), and the additional metadata can inform a determination of processing steps at DPU 304c, or the additional metadata can be passed along to the destination 306c to inform processing that occurs there. Additionally, the eBPF 320 can read metadata generated by eBPF 328, which is encoded, e.g., on a header of the IP packets. The additional metadata from DPU 304a and the metadata from eBPF 328 can be used together (e.g., correlated) to inform processing steps performed in the CPU 314 and/or in kernel 310.

When a central controller is used to determine which network functions are provisioned and where they are provisioned, the metadata generated at each of the nodes can be conveyed to the central controller, and this metadata can be used to inform the decisions of the central controller.

When a distributed control system is used to determine which network functions are provisioned and where they are provisioned, the metadata and telemetry data can be sent to respective controllers at two or more of the nodes in the network, and these respective controllers can separately decide or coordinate which network functions are applied to the data flows and where these network functions are provisioned within the network.

Figure 4:
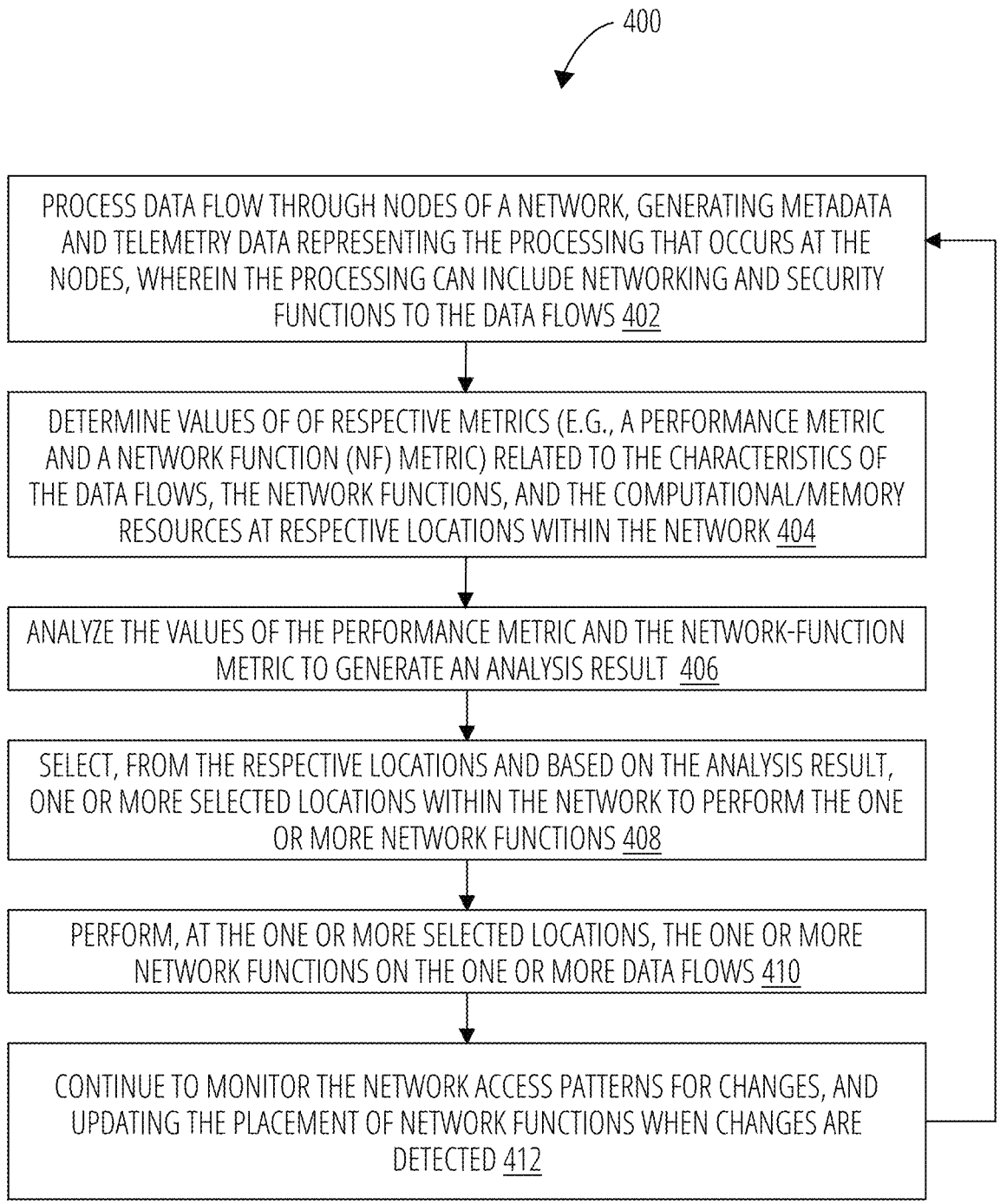
FIG. 4 illustrates a method for selecting locations within a network at which to place security services and/or network functions in accordance with one embodiment.

FIG. 4 illustrates an example method 400 for selecting locations within a network at which to place security services and/or network functions. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, in step 402, the method includes processing data flow through nodes of a network (e.g., internet edge security framework 900 or data center 1000). As the data flows are processed through the network, metadata and telemetry data can be generated. For example, the metadata and telemetry data can represent aspects related to the processing that occurs at the nodes. The processing can include networking functions and security functions that are applied to the data flows.

When a central controller is used to decide which network functions are applied to the data flows and where these network functions are provisioned within the network, the metadata and telemetry data can be sent to the central controller.

When a distributed control mechanism is used to decide which network functions are applied to the data flows and where these network functions are provisioned within the network, the metadata and telemetry data can be sent to respective controllers at two or more of the nodes in the network, and these respective controllers can separately decide or coordinate which network functions are applied to the data flows and where these network functions are provisioned within the network.

According to some examples, in step 404, the method includes determining values of respective metrics (e.g., a performance metric and a network function (NF) metric) related to the characteristics of the data flows, the network functions, and the computational/memory resources at respective locations within the network.

According to certain non-limiting examples, the performance metric can represent the amount of computational resources available at the respective locations/nodes within the network. Further, the performance metric can represent the types of computational resources available at the respective locations. Additionally or alternatively, the performance metric can represent the packet throughput capacities available at the respective location. In certain examples, the performance metric can represent indicators of resource limits of the respective locations (e.g., indicia of data-flow bottlenecks, such as the number or percentage of dropped pulses or (average) packet latencies through the respective locations.

According to certain non-limiting examples, the network-function metric can represent an amount of computational resources consumed by respective network functions; the efficacies or benefits of the network functions for addressing issues presented by the respective data flows. For example, the network-function metric can represent whether a particular node have specialized hardware that more efficiently performs the network functions. Further, the network-function metric can represent whether a particular network function is adapted to address particular issues for the data flow. For example, when the data flow is to be screened for a particular cyber threat, there can be various alternative network functions that can be used (e.g., behavioral graph analysis, signature detection, anomaly detection, IPS, etc.). Thus, the network-function metric can include a score that represents the effectiveness of the various alternative network functions for addressing the particular issues of the data flow.

According to certain non-limiting examples, the network-function metric can represent the likelihoods that the data flows at the respective locations present a particular threat that the one or more NFs defend against. For example, the network-function metric can represent the benefit of the network function as the product of the effectiveness of the network function for addressing a particular threat times the likelihood that the particular threat is present in the data flow times a value representing the impact of the particular threat not being addressed.

According to some examples, in step 406, the values of the performance metric and the network-function metric are analyzed to generate an analysis result (e.g., a score). For example, the analysis result can be an objective/optimization function that depends on various input, including, e.g., the data flows (e.g., the source identity (ID) of the data flow, such as the user ID and/or the application ID), the locations/nodes (e.g., is the node at the edge of the network, in front of a workload, in the middle of the IP fabric, etc.), the respective hardware at each of the nodes (e.g., CPU, DPU, switch, etc.), the network functions, and how the network functions are provisioned (e.g., as an eBPF, an application, a P4 program, etc.). By minimizing (or maximizing) the objective/optimization function the optimal set of network functions and their optimal placement within the network can be determined. As discussed above, the analysis of the metrics can be performed globally at a central controller, or the analysis can be performed locally using a distributed control scheme in which respective controllers at the nodes of the network determine (separately or in coordination with each other) which network functions are applied to the data flows at the respective nodes.

According to some examples, in step 408, based on the analysis result, the system selects which network functions to provision and/or where the network functions are to be provisioned. This is, based on the analysis result, the method includes selecting, from the respective locations, one or more selected locations within the network to perform the network functions.

According to some examples, in step 410, the network functions are provisioned at the selected locations, and the network functions are applied to the data flows.

According to some examples, in step 412, the method includes continuing to monitor the network access patterns for changes, and updating the placement of network functions when changes are detected. The placement of network functions can be updated by returning to step 402 and repeating the above steps.

Figure 5:
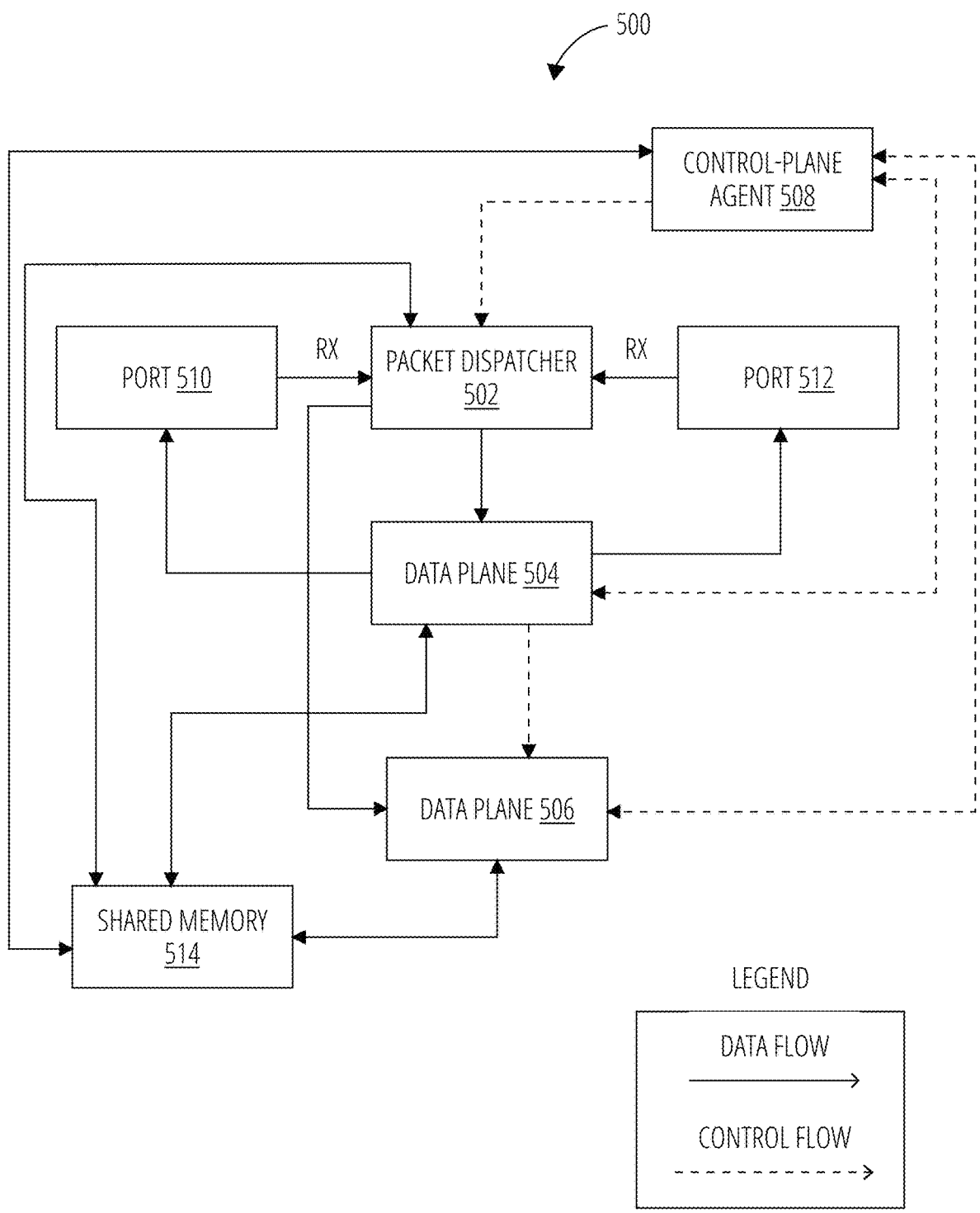
FIG. 5 illustrates a block diagram of a first example of implementing dual dataplanes in DPUs, in accordance with certain embodiments.
Figure 6:
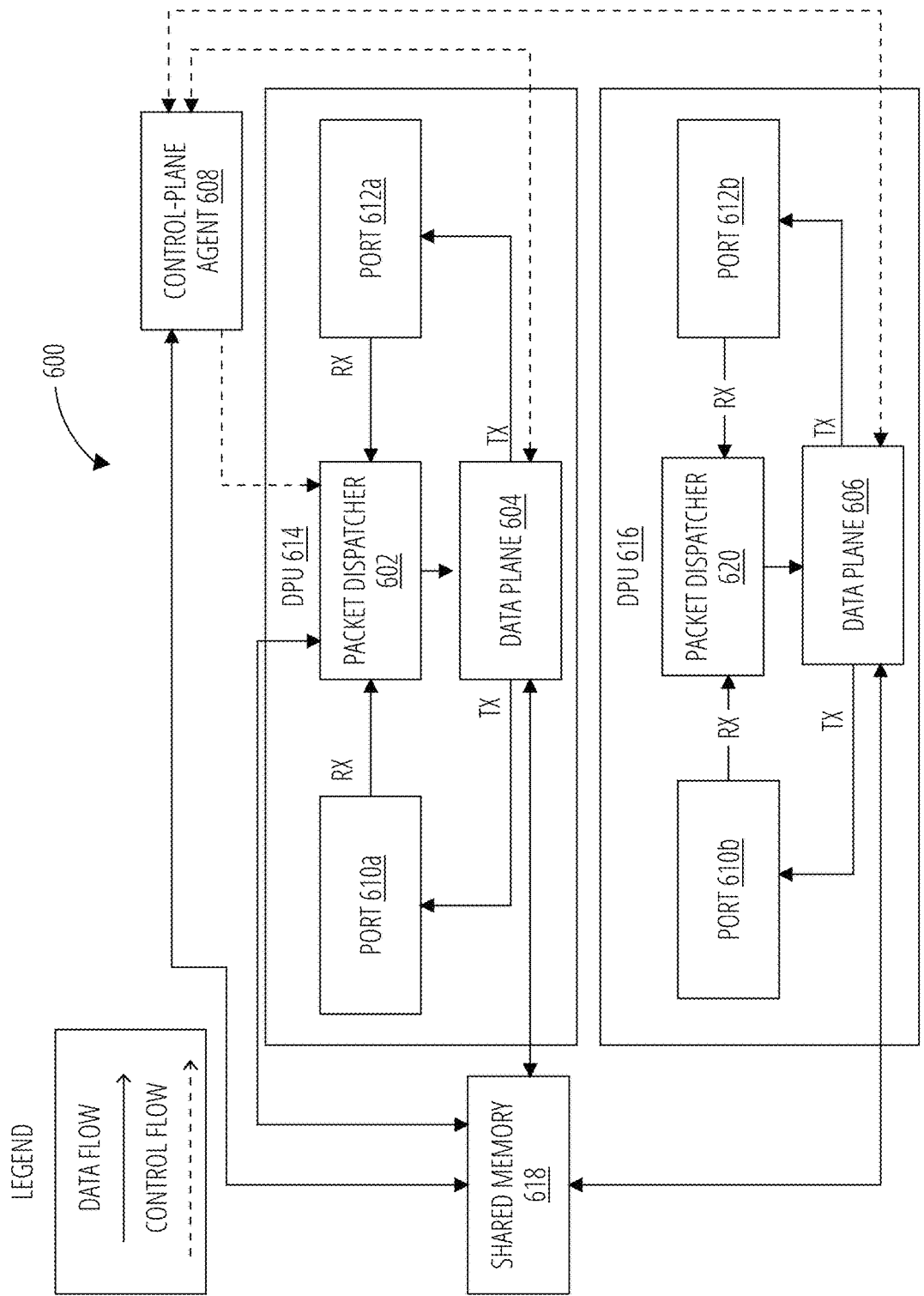
FIG. 6 illustrates a block diagram of a second example of implementing dual dataplanes in DPUs, in accordance with certain embodiments.

FIG. 5 illustrates a non-limiting example of a CPU data plane architecture 500 for a network appliance. FIG. 6 shows another data plane architecture for use with DPUs (i.e., the DPU data plane architecture 600). In a physical processor or virtual machine (VM) that does not have access to DPUs, the systems and methods disclosed herein provide the ability to run one or more data planes in parallel. These data planes can be used, e.g. to support a dual data plane model of continuous integration, continuous deployment (CI/CD) upgrades with inline validation.

As illustrated in FIG. 5, ingress packets are received through port 510 and port 512 to the packet dispatcher 502, and then the packet dispatcher 502 selects which of these data packets to direct to the data plane 504 and the data plane 506. For example, in certain modes, the packets can be mirrored such that identical replicas are sent to both data planes. In contrast, in other modes, different sets of data packets can be directed to each of the data planes. In FIG. 5 only the packets from the data plane 504 are transmitted to port 510 and port 512. Both data planes can process and transmit packets from the network component/device implemented using the CPU data plane architecture 500. Additionally, throughout a promotion mode, the "New Primary" data plane (i.e., data plane 506) can gracefully transition from not sending packets to the ports to being the only of the two data planes that is sending packets to the ports. Control signal flow between the control-plane agent 508 and each of the packet dispatcher 502, the data plane 504, and the data plane 506. Further, control signal can flow from the data plane 504 to the data plane 506.

The CPU data plane architecture 500 includes a shared memory 514 that can be accessed by respective components of the CPU data plane architecture 500, including, e.g., being accessed by the packet dispatcher 502, data plane 504, data plane 506, and control-plane agent 508. The shared memory 514 enables the data planes to operate as stateless as possible by storing state-type information in the shared memory 514, which is accessible by all components of the system. This can allow the packet dispatcher 502 to monitor the performance of both data planes. Further, these features can also allow flows to be migrated from one data plane to the other since the state is isolated.

The CPU data plane architecture 500 can use several functions to realize the various modes. For example, the network devices can be deployed on HA, and, more particularly, two modes of HA can be used: (i) active/standby HA between the data planes (e.g., when in the Normal Mode active/standby HA is used with data plane 504 in active HA and the data plane 506 in standby HA) and (ii) active/active HA between the data planes (e.g., when in the Scale-out Mode active/active HA is used with data plane 504 and data plane 506 in active HA).

For example, when the network device is a firewall, operating in active/standby HA entails that the first firewall processes all the traffic, and the second firewall, which is a clone of the first firewall, is waiting to take over. Continuing the non-limiting firewall example, operating in active/active HA entails both the first firewall and the second firewall are active (i.e., processing traffic). For example, half the traffic can be sent to the first firewall and the remaining half the traffic can be sent to the second firewall, thereby leveraging all of the compute on that system.

These functions are enabled (in part) by: (i) keeping the data planes as stateless as possible and (ii) storing state-type information in a shared memory that is accessible by all components of the CPU data plane architecture 500. This allows the packet dispatcher 502 to monitor the performance of both data planes. This also allows flows to be migrated from one data plane to the other because the state is isolated.

Additionally, the data planes can share additional components. For example, the data planes can share a common random number generator. Consider the case in which the data planes are used when performing men-in-the-middle interception of TLS sessions. In this case, a secret key is generated, and the key should be the same value for both data planes so that the traffic can be mirrored through both data planes. That is, the data planes need to generate the identical key, so that they can understand the resulting response in the TLS session. The keys are generated using a random number from a random number generator. Accordingly, by using the same random number from a common random generator, the data planes can generate the same unique key for TLS or similar processes.

FIG. 6 illustrates a non-limiting example of a DPU data plane architecture 600. To realize the various modes, the DPU data plane architecture 600 uses the same (or similar) functions as the CPU data plane architecture 500 to realize the various modes.

For example, the network devices can be deployed on HA, and, more particularly, two modes of high availability (HA) can be used: (i) active/standby HA between the data planes (e.g., when in some modes active/standby HA is used with data plane 604 in active HA and data plane 606 in standby HA) and (ii) active/active HA between the data planes (e.g., when in the Scale-out Mode active/active HA is used with data plane 604 and data plane 606 in active HA).

Descriptions of the functions and how they enable the respective modes of the DPU dual data plane architecture have been provided above for FIG. 5. Therefore these descriptions are not repeated here.

The DPU data plane architecture 600 includes a shared memory 618 that can be accessed by respective components of the DPU data plane architecture 600, including, e.g., being accessed by the packet dispatcher 602, packet dispatcher 620, data plane 604, data plane 606, and control-plane agent 608. The shared memory 618 enables the data planes to operate as stateless as possible by storing state-type information in the shared memory 618, which is accessible by all components of the system. This can allow the packet dispatchers 602 and 620 to monitor the performance of both data planes. Further, these features can also allow flows to be migrated from one data plane to the other since the state is isolated.

In DPU environments, however, it may not be possible for the data planes to run entirely stateless, e.g., when leveraging hardware acceleration. To address this difference, during the promotion mode, session re-establishment may be used, resulting in a truly graceful promotion mode taking longer in the DPU data plane architecture 600 than in the CPU data plane architecture 500.

As illustrated in FIG. 6, ingress packets are received through port 610a and port 612a of DPU 614, and then the ingress packets are transmitted from the respective ports to the packet dispatcher 602 and packet dispatcher 620. The packet dispatcher 602 then selects which of the received data packets are directed to data plane 604 and which of the received data packets are directed to data plane 606. For example, in certain modes the packets can be mirrored such that identical replicas are sent to both data planes. In contrast, in other modes, different sets of data packets can be directed to each of the data planes. In FIG. 6 only the packets from data plane 604 are transmitted to port 610a and port 612a of DPU 614, and the packets from data plane 606 are transmitted to port 610b and port 612b of DPU 616.

Depending on which mode the DPU data plane architecture 600 is in, packets might not be sent to DPU 616, and, even when the packets are sent to and processed by DPU 616, the packets might not be transmitted from the ports of DPU 616 (i.e., port 610b and port 612b). For example, in certain modes, data plane 606 is in standby and does not receive any data packets. In contrast, in other modes, data plane 606 is active, and both DPUs are engaged in processing and sending packets from their respective ports. Further, in a third type of mode, packets that are identical replicas are sent to and processed by both data planes, but only DPU 616 transmits the processed packets from its ports.

Control signals can flow between the control-plane agent 608 and each of the packet dispatcher 602, packet dispatcher 620, data plane 604, and data plane 606.

Figure 7A:
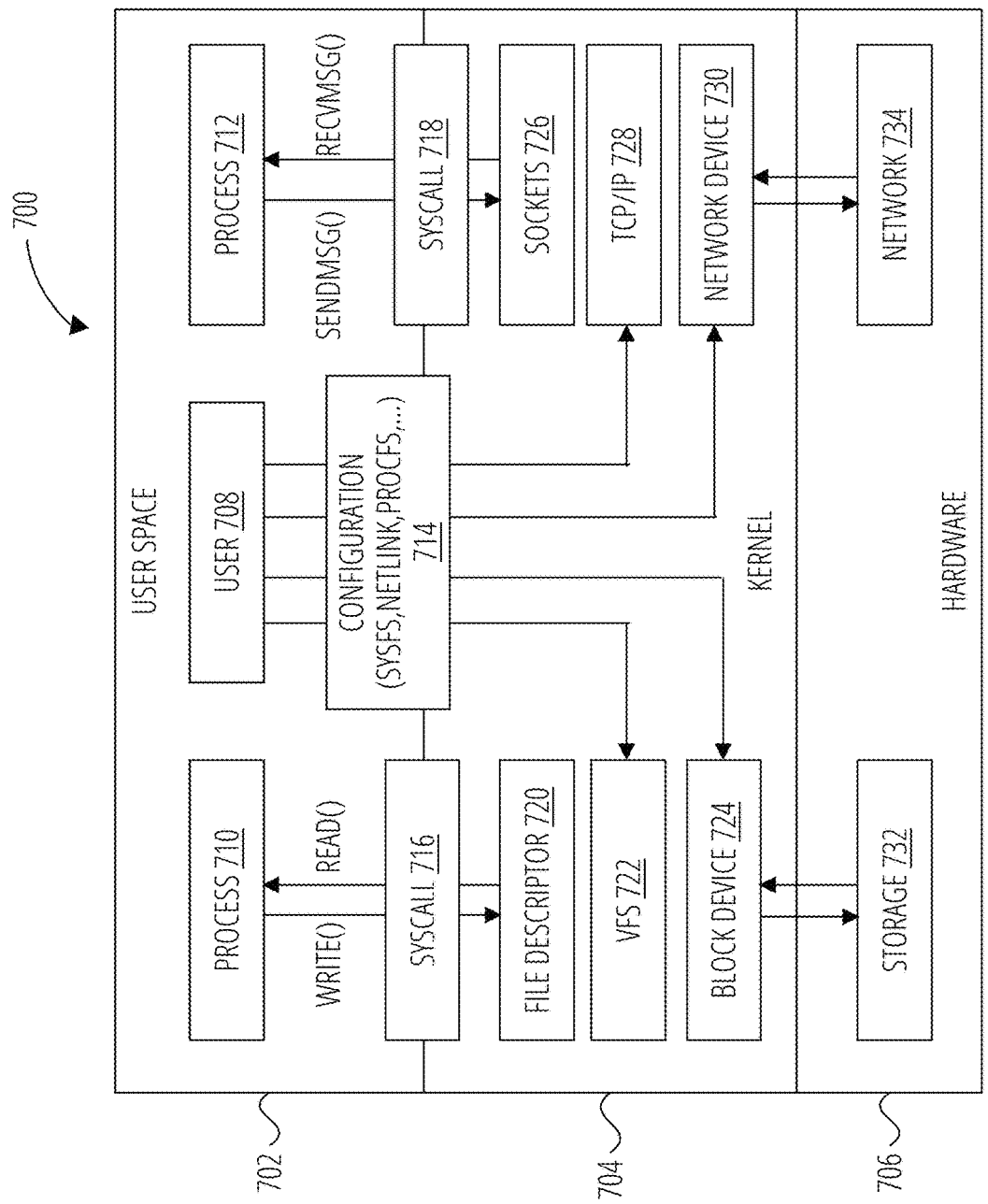
FIG. 7A illustrates a block diagram of an example of an eBPF, in accordance with some embodiments.

FIG. 7A illustrates a non-limiting example of implementing an eBPF. The eBPF architecture 700 can be implemented on a CPU and includes a user space 702, kernel 704, and hardware 706. For example, the user space 702 can be a place where regular applications run, whereas the kernel 704 is where most operating system-related processes run. An eBPF in a processor at a node (e.g., a server or router) of the network can be used to apply network functions and generate network data based on the processing of data flows, including, e.g., program traces and data the types of system calls to kernel 704. This network data can be used to generate in-band information and out-of-band information that provides the security service context for which security services have been applied to a data flow at the respective nodes within a network.

Kernel 704 can have direct and full access to the hardware 706. When a given application in user space 702 connects to hardware 706, the application can do so via calling APIs in kernel 704. Separating the application and the hardware 706 can provide security benefits. An eBPF can allow user-space applications to package the logic to be executed in kernel 704 without changing the kernel code or reloading.

Since eBPF programs run in the kernel 704, the eBPF programs can have visibility across all processes and applications, and, therefore, they can be used for many things: network performance, security, tracing, and firewalls.

The user space 702 can include a process 710, a user 708, and process 712. Kernel 704 can include a file descriptor 720, a VFS 722, a block device 724, sockets 726, a TCP/IP 728, and a network device 730. Hardware 706 can include storage 732 and network 734.

eBPF programs are event-driven and are run when the kernel or an application passes a certain hook point. Predefined hooks include system calls, function entry/exit, kernel tracepoints, network events, and several others. If a predefined hook does not exist for a particular need, it is possible to create a kernel probe (kprobe) or user probe (uprobe) to attach eBPF programs almost anywhere in kernel or user applications. When the desired hook has been identified, the eBPF program can be loaded into kernel 704 using the bpf system call (e.g., syscall 716 or syscall 718). This is typically done using one of the available eBPF libraries. The next section provides an introduction into the available development toolchains. Verification of the eBPF program ensures that the eBPF program is safe to run. It validates that the program meets several conditions (e.g., the conditions can be that the process loading the eBPF program holds the required capabilities/privileges; the program does not crash or otherwise harm the system; and the program always runs to completion).

A benefit of kernel 704 is abstracting the hardware (or virtual hardware) and providing a consistent API (system calls) allowing for applications to run and share the resources. To achieve this, a wide set of subsystems and layers are maintained to distribute these responsibilities. Each subsystem can allow for some level of configuration (e.g., configuration 714) to account for different needs of users. Each subsystem can allow for some level of configuration to account for the different needs of users. When a desired behavior cannot be configured, kernel 704 can be modified to perform the desired behavior. This modification can be realized in three different ways: (1) by changing kernel source code, which may take a long time (e.g., several years) before a new kernel version becomes available with the desired functionality; (2) writing a kernel module, which may require regular editing (e.g., every kernel release) and incurs the added risk of corrupting the kernel 704 due to lack of security boundaries; or (3) writing an eBPF program that realizes the desired functionality. Beneficially, eBPF allows for reprogramming the behavior of kernel 704 without requiring changes to kernel source code or loading a kernel module.

Many types of eBPF programs can be used, including socket filters and system call filters, networking, and tracing. Socket filter type eBPF programs can be used for network traffic filtering, and can be used for discarding or trimming of packets based on the return value. XDP type eBPF programs can be used to improve packet processing performance by providing a hook closer to the hardware (at the driver level), e.g., to access a packet before the operative system creates metadata. Tracepoint type eBPF programs can be used instrument kernel code, e.g., by attaching an eBPF program when a "perf" event is opened with a command "perf_event_open(2)", then use the command "ioctl(2)" to return a file descriptor that can be used to enable the associated individual event or event group and to attach the eBPF program to the tracepoint event. Helper type eBPF programs can be used to determines which subset of in kernel functions can be called. Helper functions are called from within eBPF programs to interact with the system, to operate on the data passed as context, or to interact with maps.

Figure 7B:
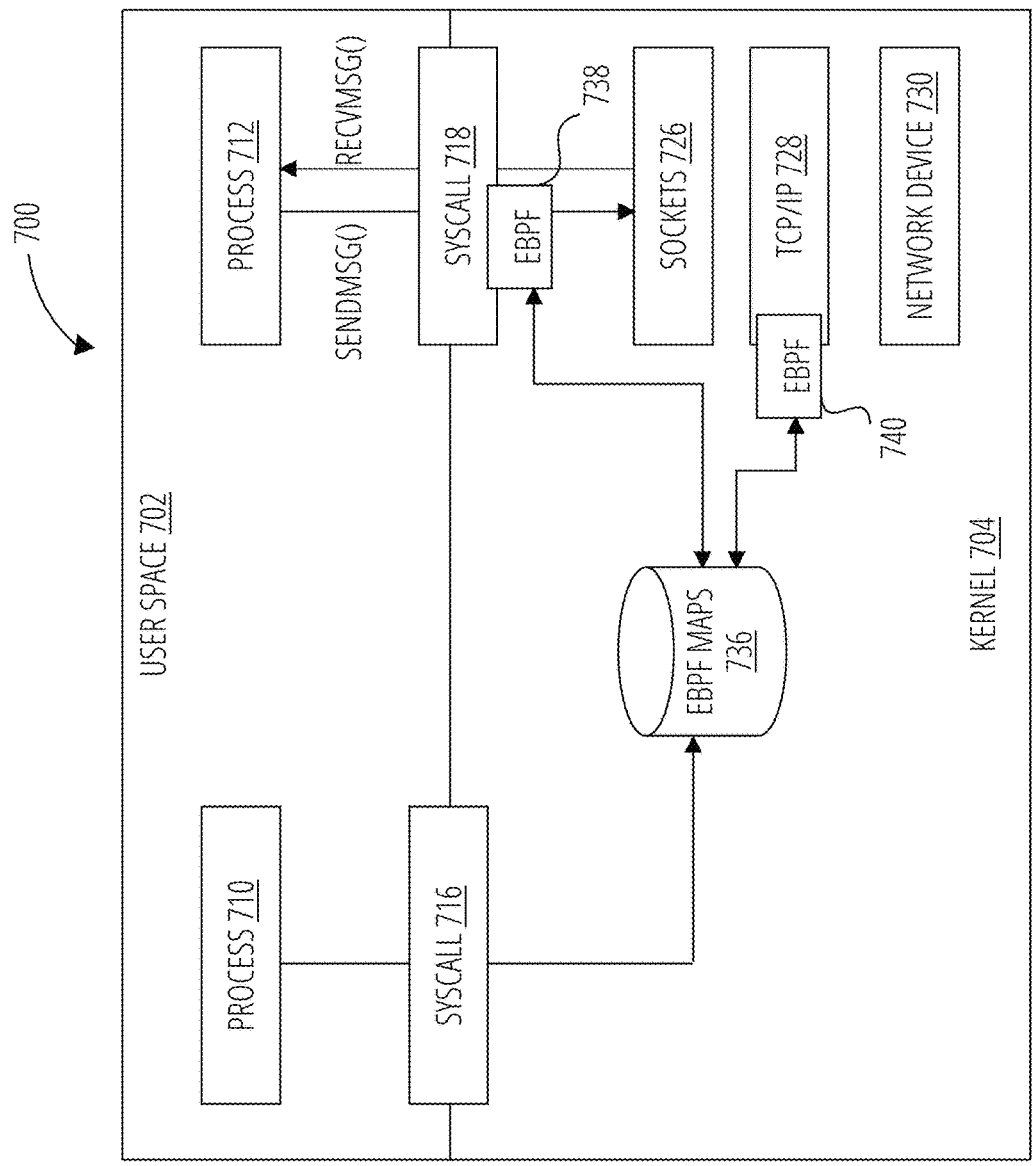
FIG. 7B illustrates a block diagram of an example of an eBPF map in an eBPF, in accordance with some embodiments.

FIG. 7B illustrates JIT compilation of eBPF programs. JIT compilation translates the generic bytecode of the program into the machine specific instruction set to optimize execution speed of the program. This makes eBPF programs run as efficiently as natively compiled kernel code or as code loaded as a kernel module.

An aspect of eBPF programs is the ability to share collected information and to store state information. For example, eBPF programs can leverage eBPF maps 736 to store and retrieve data in a wide set of data structures. The eBPF maps 736 can be accessed from eBPF program 738 and eBPF program 740 as well as from applications (e.g., process 710 and process 712) in user space 702 via a system call (e.g., syscall 716 and syscall 718). Non-limiting examples of supported map types include, e.g., hash tables, arrays, least recently used (LRU), ring buffer, stack trace, and longest prefix match (LPM), which illustrates the diversity of data structures supported by eBPF programs.

Figure 8:
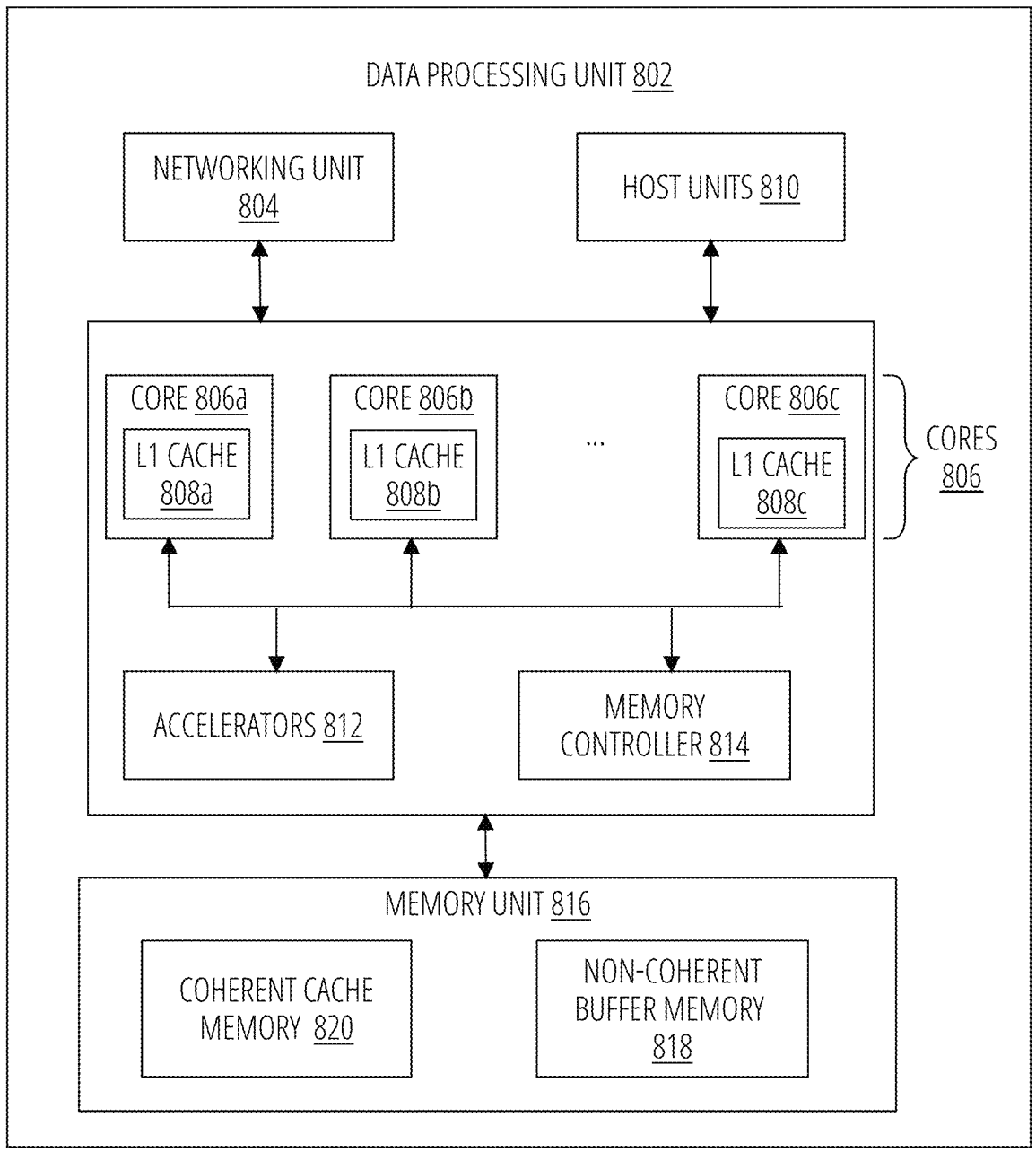
FIG. 8 illustrates a block diagram of an example of a DPU, in accordance with some embodiments.

A non-limiting example of a data processing unit (i.e., DPU 802) is illustrated in FIG. 8. The DPU 802 can include two or more processing cores, for example. DPU 802 can be a hardware chip that is implemented in digital logic circuitry and can be used in any computing or network device. The DPU 802 can be used to perform network functions and to generate in-band metadata and out-of-band metadata at the respective nodes within a network.

DPU 802 can receive and transmit data packets via networking unit 804, which can be configured to function as an ingress port and egress port, enabling communications with one or more network devices, server devices (e.g., servers), random access memory, storage media (e.g., SSDs), storage devices, or a data center fabric. The ports can include, e.g., a PCI-e port, Ethernet (wired or wireless) port, or other such communication media. Additionally or alternatively, DPU 802 can be implemented as an ASIC, can be configurable to operate as a component of a network appliance or can be integrated with another DPUs within a device.

In FIG. 8, e.g., DPU 802 can include programmable processing cores, e.g., core 806a, core 806b, . . . , core 806c (collectively referred to as "cores 806") and each of the cores 806 can include an L1 cache (e.g., L1 cache 808a, L1 cache 808b, . . . , L1 cache 808c). DPU 802 can include a memory unit 816. Memory unit 816 can include different types of memory or memory devices (e.g., coherent cache memory 820 and non-coherent buffer memory 818). In some examples, the cores 806 can include at least two processing cores. DPU 802 also includes a networking unit 804, host units 810, a memory controller 814, and accelerators 812. Each of the cores 806, networking unit 804, memory controller 814, host units 810, accelerators 812, and memory unit 816 including coherent cache memory 820 and non-coherent buffer memory 818 can be connected to allow communication therebetween.

Cores 806 can comprise one or more of MIPS cores, ARM cores, PowerPC cores, RISC-V (RISC five) cores, or CISC or x86 cores. Each of cores 806 can be programmed to process events or activities related to a given data packet such as, For example, a networking packet or a storage packet. Each of cores 806 can be programmable using a high-level programming language, e.g., C or C++.

The use of DPUs can be beneficial for network processing of data flows. In some examples, cores 806 can be capable of processing data packets received by networking unit 804 and/or host units 810, in a sequential manner using one or more "work units." In general, work units are sets of data exchanged between cores 806 and networking unit 804 and/or host units 810.

Memory controller 814 can control access to memory unit 816 by cores 806, networking unit 804, and any number of external devices, e.g., network devices, servers, or external storage devices. Memory controller 814 can be configured to perform a number of operations to perform memory management in accordance with the present disclosure. In some examples, memory controller 814 can be capable of mapping a virtual address to a physical address for non-coherent buffer memory 818 by performing a number of operations. In some examples, memory controller 814 can be capable of transferring ownership of a cache segment of the plurality of segments from core 806a to core 806b by performing a number of operations.

DPU 802 can act as a combination of a switch/router and a number of network interface cards. For example, networking unit 804 can be configured to receive one or more data packets from and transmit one or more data packets to one or more external devices, e.g., network devices. Networking unit 804 can perform network interface card functionality and packet switching.

Additionally or alternatively, networking unit 804 can be configured to use large forwarding tables and offer programmability. Networking unit 804 can advertise Ethernet ports for connectivity to a network. In this way, DPU 802 supports one or more high-speed network interfaces, e.g., Ethernet ports, without the need for a separate network interface card (NIC). Each of host units 810 can support one or more host interfaces, e.g., PCI-e ports, for connectivity to an application processor (e.g., an x86 processor of a server device or a local CPU or GPU of the device hosting DPU 802) or a storage device (e.g., a solid state drive (SSD)). DPU 802 can also include one or more high bandwidth interfaces for connectivity to off-chip external memory (not illustrated in FIG. 8). Each of accelerators 812 can be configured to perform acceleration for various data-processing functions, such as look-ups, matrix multiplication, cryptography, compression, or regular expressions. For example, accelerators 812 can comprise hardware implementations of look-up engines, matrix multipliers, cryptographic engines, compression engines, or regular expression interpreters.

DPU 802 can improve efficiency over x86 processors for targeted use cases, such as storage and networking input/output, security and network function virtualization (NFV), accelerated protocols, and as a software platform for certain applications (e.g., storage, security, and data ingestion). DPU 802 can provide storage aggregation (e.g., providing direct network access to flash memory, such as SSDs) and protocol acceleration. DPU 802 provides a programmable platform for storage virtualization and abstraction. DPU 802 can also perform firewall and address translation processing, stateful deep packet inspection, and cryptography. The accelerated protocols can include TCP, UDP, TLS, IPSec (e.g., accelerates AES variants, SHA, and PKC), RDMA, and iSCSI. DPU 802 can also provide QoS and isolation containers for data, and provide LLVM binaries.

DPU 802 can support software including network protocol offload (e.g., TCP/IP acceleration, RDMA and RPC); initiator and target side storage (e.g., block and file protocols); high-level application APIs (e.g., compute, network and storage APIs); fine-grain load balancing, traffic management, and QoS; network virtualization and NFV; and firewall, security, deep packet inspection (DPI), and encryption (e.g., IPsec, and SSL/TLS).

Figure 9:
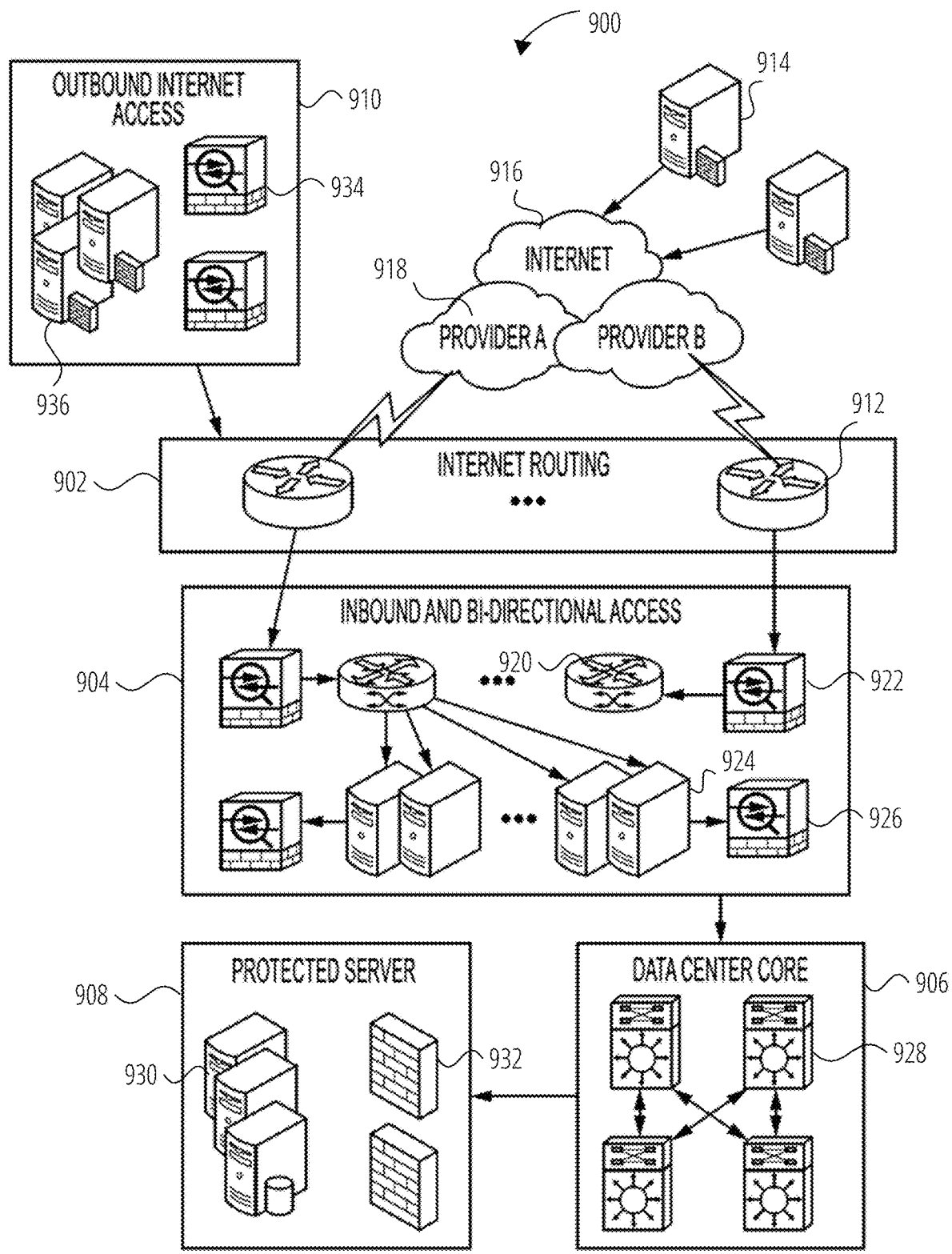
FIG. 9 illustrates a block diagram of an example of a network that implements the dynamically programmed security services in network components that are placed in front of respective workloads, in accordance with some embodiments.

FIG. 9 illustrates a block diagram of one non-limiting example of an internet edge security framework 900 the includes internet routing 902, inbound and bi-directional access 904, a data center core 906, a back-end protected server (e.g., protected server 908), and outbound internet access 910. The internet edge security framework 900 can exemplify several aspects of security principles that are applicable for cloud computing, such as in secure web and/or e-commerce design. The various load balancers, servers, routers, firewalls, and switches illustrated in the internet edge security framework 900 can function as nodes in the network that apply network functions to the data flow and generate the in-band and out-of-band metadata that is used to determine where to provision the network functions in accordance with the systems and methods disclosed herein.

According to certain non-limiting examples, the proxy server 914 can be a global web cache proxy server that provides enhanced website response to clients within the WWW and provides additional DoS protection and flooding protection. Traffic from the proxy server 914 is conducted through the internet 916 via providers 918. The internet routing can be provided by routers 912, which can be multi-homed BGP internet routers. Further, internet routing 902 can provide BGP transit autonomous system AS prevention mechanisms such as AS filtering, no-export community value.

According to certain non-limiting examples, inbound and bi-directional access 904 can be an external DMZ that provides, e.g., external firewalls (e.g., ingress firewall 922) and/or IPS. For example, inbound and bi-directional access 904 can provide protection to public Internet Protocol (IP) addressed dedicated, internally un-routable address spaces for communications to load balancers and server untrusted interfaces. The inbound and bi-directional access 904 can be tuned to provide additional TCP SYN flooding and other DoS protection. In addition to providing reconnaissance scanning mitigation, the IPS service modules (e.g., provided by the load balancer 920) can protect against man-in-the-middle and injection attacks.

The load balancers 920 can provide enhanced application layer security and resiliency services in terminating HTTPS traffic and communicating with front-end web servers 924 on behalf of external clients. For example, external clients do not initiate a direct TCP session with the front-end web servers 924. According to certain non-limiting examples, only the front-end web servers 924 receive requests on untrusted interfaces, and the front-end web servers 924 only make requests to the back-end servers 930 on trusted interfaces. The data center core 906 can include several route switch processors route switch processor 928.

The protected server 908 is protected by the back-end firewall 932 and IPS to provide granular security access to back-end databases. The protected server 908 protects against unauthorized access and logs blocked attempts for access.

According to certain non-limiting examples, the internet edge security framework 900 provides defense in depth. Further, internet edge security framework 900 can advantageously use a dual-NIC configured according to a trusted/un-trusted network model as a complement to a layered defense in depth approach.

According to certain non-limiting examples, the internet edge security framework 900 can include a DMZ environment (e.g., inbound and bi-directional access 904), which can be thought of as the un-trusted side of the infrastructure. The front-end web servers 924 can have a NIC, which includes the ingress firewall 922 and through which requests are received from outside of the internet edge security framework 900. Additionally, servers can be configured with a second NIC (e.g., egress firewall 926) and can connect to a trusted network (e.g., protected server 908) that is configured with an internal address. According to certain non-limiting examples, firewall services can be provided for protected server 908, which is an area of higher trust. Front-end web servers 924 can make back-end requests on the egress firewall 926. According to certain non-limiting examples, front-end web servers 924 can limit receiving requests to the un-trusted NIC, and front-end web servers 924 can limit making requests to the trusted NIC.

According to certain non-limiting examples, an additional layer of protection can be added by placing a load balancer (e.g., load balancer 920) in front of the front-end web servers 924. For example, the load balancers 920 can terminate TCP sessions originating from hosts on the internet. Further, the load balancers 920 can act as proxies, and initiate another session to the appropriate VIP pool members, thereby advantageously providing scalability, efficiency, flexibility, and security.

Further regarding internet routing 902, routers 912 can provide IP filtering. For example, firewalls can be integrated with routers 912. These firewalls can filter out traffic and reduce the footprint of exposure. For example, routers 912 can be used to filter addresses. Further, routers 912 and/or ingress firewall 922 can be used to perform ingress filtering to cover multi-homed networks. Additionally or alternatively, routers 912 can provide some basic spoofing protection, e.g., by straight blocking large chunks of IP space that are not used as source addresses on the internet. Depending on its capacity, routers 912 can be used to provide some additional filtering to block, e.g., blacklisted IP blocks. Additionally or alternatively, routers 912 can provide protection against BGP attacks.

In addition to using dual NICs, the internet edge security framework 900 further illustrates using two separate environments on two different firewall pairs and/or clusters (e.g., a front-end environment such as the inbound and bi-directional access 904 and a back-end environment such as the protected server 908. According to certain non-limiting examples, the internet edge security framework 900 can use a simplified architecture with an HA firewall pair for the front end and a separate HA firewall pair for the back end. The back-end environment can include the databases and any other sensitive file servers.

For example, inbound web requests can have the following structure: End host sources secure SSL session=>(Internet Cloud)=>Edge Routers=>Edge Firewall un-trusted DMZ=>(optional) Load Balancer=>Un-trusted web server NIC=/=Trusted web server NIC initiates a database fetch to the back end server=>Edge firewall trusted DMZ=>Data center network core=>Back-End firewall=>High security database DMZ server.

Regarding outbound internet access 910, the internet edge security framework 900 can use a web proxy solution to provide internet access for internal clients. The outbound internet access 910 can include outbound firewalls 934 and outbound proxy servers 936. The outbound proxy servers 936 can provide web filtering mechanisms, internet access policy enforcement and most provide some flavor of data loss prevention, SSL offloading, activity logging, and audit capabilities, for example. In the reverse fashion from the inbound connectivity module, proxy servers can receive requests on trusted interfaces and can make requests on un-trusted interfaces.

Figure 10A:
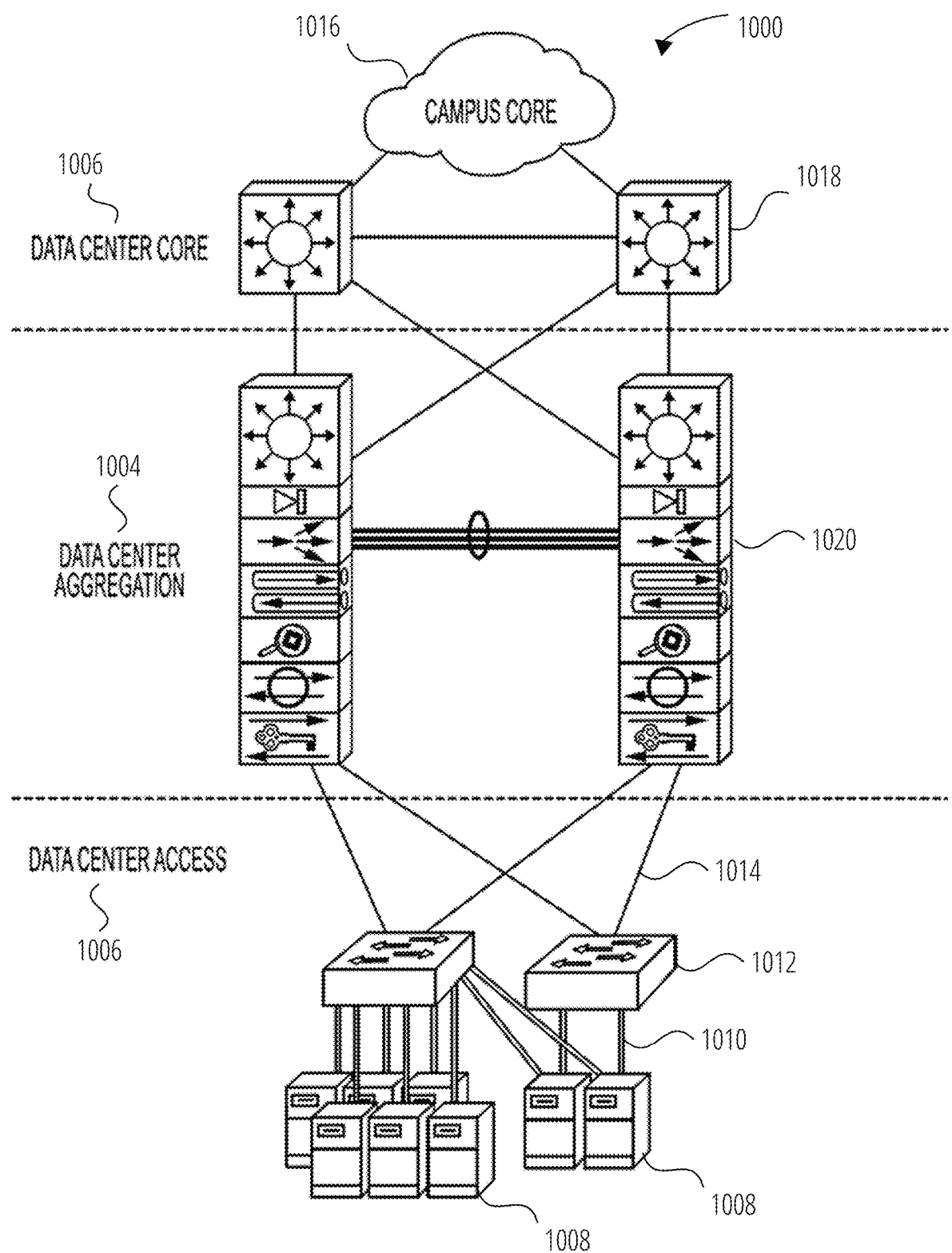
FIG. 10A illustrates a block diagram of an example of a network having an access cluster in the access layer, in accordance with some embodiments.

FIG. 10A illustrates a non-limiting example of a data center 1000 (e.g., a multi-tier data center), which includes data center access 1002, data center aggregation 1004, and data center core 1006. The data center 1000 provides computational power, storage, and applications that can support an enterprise business, for example. The various processors, servers, routers, firewalls, and switches illustrated in the data center 1000 can function as nodes in the network that apply security services to the data flow and generate the in-band and out-of-band information of the systems and methods disclosed herein.

The network design of the data center 1000 can be based on a layered approach. The layered approach can provide improved scalability, performance, flexibility, resiliency, and maintenance. As shown in FIG. 10A, the layers of the data center 1000 can include the core, aggregation, and access layers (i.e., data center core 1006, data center aggregation 1004, and data center access 1002).

The data center core 1006 layer provides the high-speed packet switching backplane for all flows going in and out of the data center 1000. The data center core 1006 can provide connectivity to multiple aggregation modules and provides a resilient Layer 3 routed fabric with no single point of failure. The data center core 1006 can run an interior routing protocol, such as OSPF or EIGRP, and load balances traffic between the campus core and aggregation layers using forwarding-based hashing algorithms, for example.

The data center aggregation 1004 layer can provide functions such as service module integration, Layer 2 domain definitions, spanning tree processing, and default gateway redundancy. Server-to-server multi-tier traffic can flow through the aggregation layer and can use services, such as firewall and server load balancing, to optimize and secure applications. The smaller icons within the aggregation layer switch in FIG. 10A represents the integrated service modules. These modules provide services, such as content switching, firewall, SSL offload, intrusion detection, network analysis, and more.

The data center access 1002 layer is where the servers physically attach to the network. The server components can be, e.g., 1RU servers, blade servers with integral switches, blade servers with pass-through cabling, clustered servers, and mainframes with OSA adapters. The access layer network infrastructure can include modular switches, fixed configuration 1 or 2RU switches, and integral blade server switches. Switches provide both Layer 2 and Layer 3 topologies, fulfilling the various server broadcast domain or administrative requirements.

The architecture in FIG. 10A is an example of a multi-tier data center, but server cluster data centers can also be used. The multi-tier approach can include web, application, and database tiers of servers. The multi-tier model can use software that runs as separate processes on the same machine using IPC, or the multi-tier model can use software that runs on different machines with communications over the network. Typically, the following three tiers are used: (i) Web-server; (ii) Application; and (iii) Database. Further, multi-tier server farms built with processes running on separate machines can provide improved resiliency and security. Resiliency is improved because a server can be taken out of service while the same function is still provided by another server belonging to the same application tier. Security is improved. For example, an attacker can compromise a web server without gaining access to the application or database servers. Web and application servers can coexist on a common physical server, but the database typically remains separate. Load balancing the network traffic among the tiers can provide resiliency, and security is achieved by placing firewalls between the tiers. Additionally, segregation between the tiers can be achieved by deploying a separate infrastructure composed of aggregation and access switches, or by using VLANs. Further, physical segregation can improve performance because each tier of servers is connected to dedicated hardware. The advantage of using logical segregation with VLANs is the reduced complexity of the server farm. The choice of physical segregation or logical segregation depends on your specific network performance requirements and traffic patterns.

The data center access 1002 includes access server clusters 1008, which can include layer 2 access with clustering and NIC teaming. The access server clusters 1008 can be connected via GigE connections gigabit ethernet connection 1010 to workgroup switches 1012. The access layer provides the physical level attachment to the server resources and operates in Layer 2 or Layer 3 modes for meeting particular server requirements such as NIC teaming, clustering, and broadcast containment.

The data center aggregation 1004 can include aggregation processor 1020, which is connected via 10 gigabit ethernet connection 1014 (e.g., 10 GigE connections) to the data center access 1002 layer.

The aggregation layer can be responsible for aggregating the thousands of sessions leaving and entering the data center. The aggregation switches can support, e.g., many 10 GigE and GigE interconnects while providing a high-speed switching fabric with a high forwarding rate. The aggregation processor 1020 can provide value-added services, such as server load balancing, firewalling, and SSL offloading to the servers across the access layer switches. The switches of the aggregation processor 1020 can carry the workload of spanning tree processing and default gateway redundancy protocol processing.

For an enterprise data center, the data center aggregation 1004 can contain at least one data center aggregation module that includes two switches (i.e., aggregation processors 1020). The aggregation switch pairs work together to provide redundancy and to maintain the session state. For example, the platforms for the aggregation layer include the CISCO CATALYST switches equipped with SUP720 processor modules. The high switching rate, large switch fabric, and ability to support a large number of 10 GigE ports are important requirements in the aggregation layer. The aggregation processors 1020 can also support security and application devices and services, including, e.g.: (i) Cisco FWSMs; (ii) Cisco Application Control Engine (ACE); (iii) Intrusion Detection; (iv) Network Analysis Module (NAM); and (v) Distributed denial-of-service attack protection.

The data center core 1006 provides a fabric for high-speed packet switching between multiple aggregation modules. This layer serves as the gateway to the campus core 1016 where other modules connect, including, For example, the extranet, wide area network (WAN), and internet edge. Links connecting the data center core 1006 can be terminated at Layer 3, Links connecting the data center core 1006 can use 10 GigE interfaces to support a high level of throughput and performance and use 10 GigE interfaces to meet oversubscription levels. According to certain non-limiting examples, the data center core 1006 is distinct from the campus core 1016 layer, with different purposes and responsibilities. A data center core is not necessarily required but is recommended when multiple aggregation modules are used for scalability. Even when a small number of aggregation modules are used, it might be appropriate to use the campus core for connecting the data center fabric.

The data center core 1006 layer can connect, e.g., to the campus core 1016 and data center aggregation 1004 layers using Layer 3-terminated 10 GigE links. Layer 3 links can be used to achieve bandwidth scalability, quick convergence, and to avoid path blocking or the risk of uncontrollable broadcast issues related to extending Layer 2 domains.

The traffic flow in the core can include sessions traveling between the campus core 1016 and the aggregation processors 1020. The data center core 1006 aggregates the aggregation module traffic flows onto optimal paths to the campus core 1016. Server-to-server traffic can remain within an aggregation processor 1020, but backup and replication traffic can travel between aggregation processors 1020 by way of the data center core 1006.

Figure 10B:
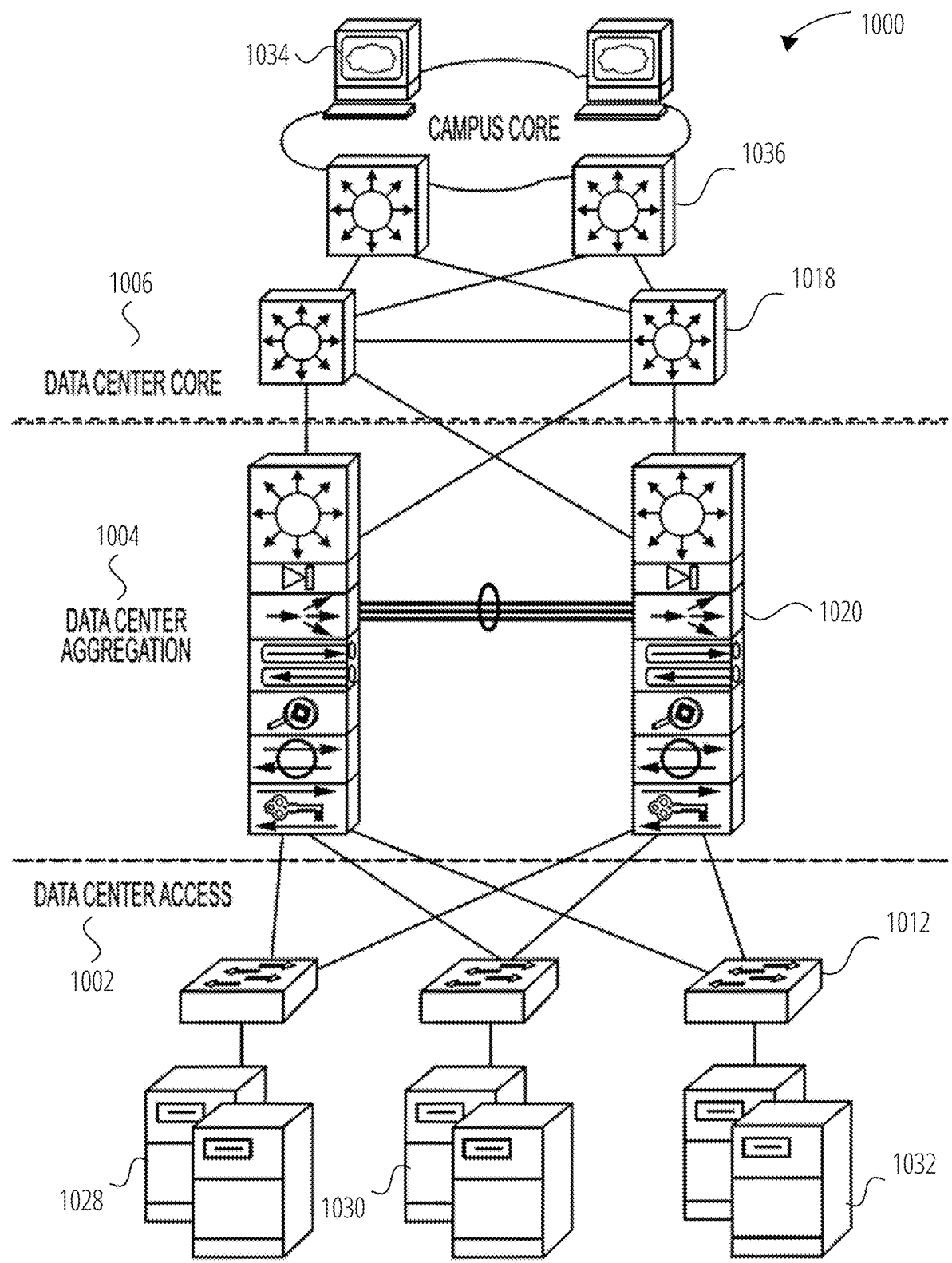
FIG. 10B illustrates a block diagram of an example of a network having respective servers (e.g., a web server, an application server, and a database server) in the access layer, in accordance with some embodiments.

FIG. 10B illustrates other aspects of the data center 1000. The connections among the multilayer switches 1018 and the other multilayer switches 1036 enable traffic flow in the data center core to the clients 1034 in the campus core 1016. The data center core 1006 can connect to the campus core 1016 and data center aggregation 1004 layer using Layer 3-terminated 10 GigE links. Layer 3 links can be used to achieve bandwidth scalability, quick convergence, and to avoid path blocking or the risk of uncontrollable broadcast issues related to extending Layer 2 domains.

According to certain non-limiting examples, the traffic flow in the core consists primarily of sessions traveling between the campus core and the aggregation modules. The core aggregates the aggregation module traffic flows onto optimal paths to the campus core.

The traffic in the data center aggregation 1004 layer primarily can include core layer to access layer flows. The core-to-access traffic flows can be associated with client HTTP-based requests to the web servers 1028, the application servers 1030, and the database servers 1032. At least two equal cost routes exist to the web server subnets. The CEF-based L3 plus L4 hashing algorithm determines how sessions balance across the equal cost paths. The web sessions might initially be directed to a VIP address that resides on a load balancer in the aggregation layer, or sent directly to the server farm. After the client request goes through the load balancer, it might then be directed to an SSL offload module or a transparent firewall before continuing to the actual server residing in the data center access 1002.

Figure 11:
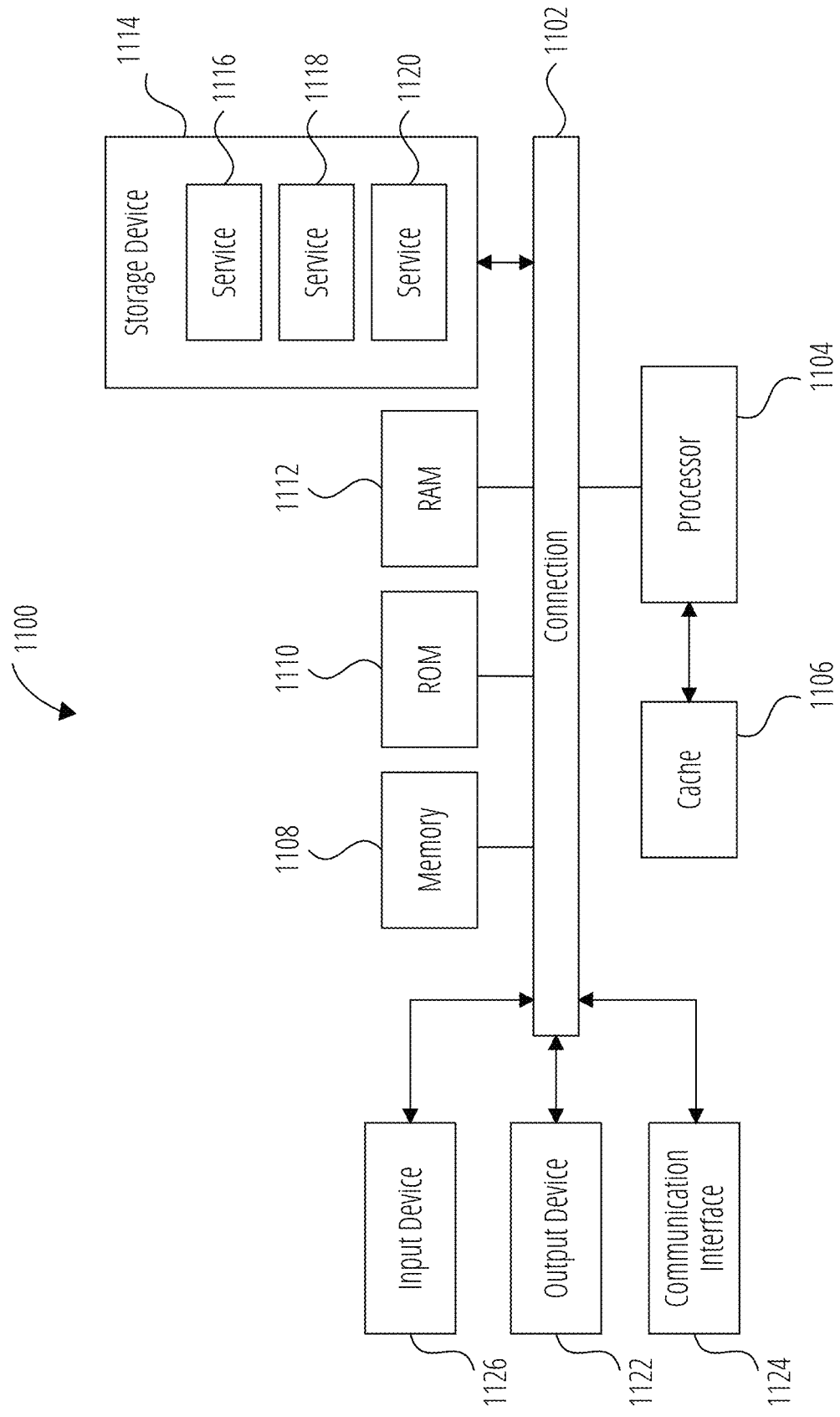
FIG. 11 illustrates a block diagram of an example of a computing device, in accordance with some embodiments.

FIG. 11 shows an example of computing system 1100, which can be for example any computing device making up system 300, internet edge security framework 900, data center 1000, or any component thereof in which the components of the system are in communication with each other using connection 1102. Connection 1102 can be a physical connection via a bus, or a direct connection into processor 1104, such as in a chipset architecture. Connection 1102 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1100 includes at least one processing unit (CPU or processor) processor 1104 and connection 1102 that couples various system components including system memory 1108, such as ROM 1110 and RAM 1112 to processor 1104. Computing system 1100 can include a cache of high-speed memory cache 1106 connected directly with, in close proximity to, or integrated as part of processor 1104.

Processor 1104 can include any general-purpose processor and a hardware service or software service, such as service 1116, service 1118, and service 1120 stored in storage device 1114, configured to control processor 1104 as well as a special-purpose processor where software instructions are incorporated into the actual processor design. Processor 1104 may essentially be a completely self-contained computing system, containing multiple cores or processors, a bus, memory controller, cache, etc. A multi-core processor may be symmetric or asymmetric.

To enable user interaction, computing system 1100 includes an input device 1126, which can represent any number of input mechanisms, such as a microphone for speech, a touch-sensitive screen for gesture or graphical input, keyboard, mouse, motion input, speech, etc. Computing system 1100 can also include output device 1122, which can be one or more of a number of output mechanisms known to those of skill in the art. In some instances, multimodal systems can enable a user to provide multiple types of input/output to communicate with computing system 1100. Computing system 1100 can include communication interface 1124, which can generally govern and manage the user input and system output. There is no restriction on operating on any particular hardware arrangement, and therefore the basic features here may easily be substituted for improved hardware or firmware arrangements as they are developed.

storage device 1114 can be a non-volatile memory device and can be a hard disk or other types of computer-readable media that can store data that are accessible by a computer, such as magnetic cassettes, flash memory cards, solid state memory devices, digital versatile disks, cartridges, RAMs, ROM, and/or some combination of these devices.

The storage device 1114 can include software services, servers, services, etc., that when the code that defines such software is executed by the processor 1104, it causes the system to perform a function. In some embodiments, a hardware service that performs a particular function can include the software component stored in a computer-readable medium in connection with the necessary hardware components, such as processor 1104, connection 1102, output device 1122, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a network devices and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, For example, instructions and data which cause or otherwise configure a general purpose computer, special purpose computer, or special purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, For example, instructions and data which cause or otherwise configure a general-purpose computer, special-purpose computer, or special-purpose processing device to perform a certain function or group of functions. Portions of computer resources used can be accessible over a network. The computer executable instructions may be, For example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for selecting locations for network functions within a network, the method comprising:
   selecting, from respective locations in the network, one or more selected locations within the network to perform one or more network functions;
   provisioning, at the one or more selected locations, the one or more network functions on respective network devices;
   provisioning an inline network function of the one or more network functions in a data plane of one of the respective network devices, wherein: the inline network function that is configured to be in-lined directly in a hardware offload device, and the inline network function is performed without a virtual machine and without a container;
   determining values of one or more metrics for the one or more network functions and for one or more data flows through the respective locations within a network;
   analyzing the values of the one or more metrics to generate an analysis result; and
   selecting the one or more selected locations based on the analysis result.

2. The method of claim 1, wherein: the inline network function is dynamically provisioned on a selected network device of the respective network devices, the selected network device being selected based on indicia of a benefit and/or available computational resources for the one or more network functions at the selected network device; and the selected network device comprises a data processing unit (DPU), extended Berkley packet filter (eBPF), switching hardware, application-specific integrated circuit (ASIC), or field programmable gate array (FPGA).

3. The method of claim 2, wherein provisioning the inline network function further comprises:
   using a serverless API call to instantiate the inline network function; and
   causing, in response to the serverless API call, an API backend to deploy a selected program from a group of programs, the selected program being selected based on a target network device into which the inline network function is to be provisioned.

4. The method of claim 3, wherein the group of programs comprises: (i) an eBPF program configured to be executed on CPUs; (ii) eBPF program configured to be executed on DPUs; (iii) a P4 program configured to be executed on the CPUs; (iv) a P4 program configured to be executed on the DPUs; (v) an eBPF program configured to be executed on switches; (iv) a P4 program configured to be executed on the switches; (vi) a program configuring an ASIC application-specific; and/or (vii) a program configuring an FPGA.

5. The method of claim 1, further comprising: selecting, based on the analysis result, a selected data flow from the one or more data flows, a selected network function from the one or more network functions, and a selected network device from the respective network devices at the one or more selected locations; and provisioning the selected network device to perform the selected network function on the selected data flow.

6. The method of claim 1, wherein: the one or more metrics comprise a performance metric and a network-function metric, values of the performance metric, at least, depending on the respective locations and the respective network devices corresponding to the respective network devices, and values of the network-function metric, at least, depending on the one or more network functions and/or the one or more data flows.

7. The method of claim 6, wherein:
the performance metric represents: a quantity of computational resources available at the respective locations; types of computational resources available at the respective locations; throughput capacities available at the respective locations; and/or indicators of resource limits at the respective locations; and
the network-function metric represents: a quantity of computational resources consumed by respective network functions of the one or more network functions; efficacies of the one or more network functions for respective data flows through the network; and/or likelihoods that the data flows at the respective locations present a threat that the one or more network functions protect against.

8. The method of claim 6, wherein the network-function metric indicates that a first network function of the one or more network functions is configurable to be accelerated by being executed on a first type of circuitry more than a second network function of the one or more network functions is accelerated by being executed on the first type of circuitry,
the performance metric indicates that a first network device at a first location within the respective locations comprises the first type of circuitry and a second network device at a second location of the respective locations does not comprise the first type of circuitry, and
based on the analysis result, the first location and the first network device are selected to perform the first network function, and the second location and the second network device are selected to perform the second network function.

9. The method of claim 6, wherein:
the network-function metric indicates that a first network function of the one or more network functions mitigates a first security threat,
the performance metric indicates a higher likelihood of mitigating effects of the first security threat when the first network function is placed at a first location within the respective locations relative to when the first network function is placed at a second location of the respective locations, and
based on the analysis result, the first network function is placed at the first location.

10. The method of claim 6, wherein:
the network-function metric indicates that a first network function consumes a given quantity of computational resources,
the performance metric indicates consuming the given quantity of computational resources at a first location within the respective locations will result in more dropped packets or more packet delays than consuming the given quantity of computational resources at a second location of the respective locations, and
based on the analysis result, the first network function is placed at the second location.

11. The method of claim 1, wherein: the analysis result indicates improved performance of the network when a first network function of the one or more network functions is placed at a first location of the respective locations and a second network function of the one or more network functions is placed at a second location of the respective locations, and based on the analysis result, the first network function is placed at the first location and the second network function is placed at the second location.

12. The method of claim 1, wherein the respective locations comprise nodes in the network, and one or more of the nodes comprise a switch, a data processing unit (DPU), a Berkley packet filter (BPF), and/or an extended BPF (eBPF).

13. The method of claim 1, further comparing: updating the analysis result based on changes to the values of the one or more metrics to generate an updated analysis result; updating the one or more selected locations based on the updated analysis result to provide an updated one or more selected locations; and moving the one or more network functions to the updated one or more selected locations by provisioning the one or more network functions on the updated one or more selected locations.

14. The method of claim 1, further comprising:
provisioning a first network function of the one or more network functions in a first network component and in a second network component;
selectively applying, at the first network component, the first network function to a first data flow;
selectively applying, at the second network component, the first network function to a second data flow, wherein:
the first data flow and the second data flow each pass through the first network component and the second network component.

15. The method of claim 14, wherein:
the first network component and the second network component are at a same node of the network,
the first network component comprises first circuitry and the second network component comprises second circuitry, and
load balancing between the first circuitry and the second circuitry is performed by using the first circuitry to apply the first network function to the first data flow, and using the second circuitry to apply the first network function to the second data flow.

16. A computing apparatus comprising:
a processor;
a memory storing instructions that, when executed by the processor, configure the computing apparatus to:
select, from respective locations in a network, one or more selected locations within the network to perform one or more network functions;
provision, at the one or more selected locations, the one or more network functions on respective network devices, including provisioning an inline network function of the one or more network functions in a data plane of one of the respective network devices, wherein: the inline network function that is configured to be in-lined directly in a hardware offload device, and the inline network function is performed without a virtual machine and without a container;
determine values of one or more metrics for the one or more network functions and one or more data flows through the respective locations within a network;
analyze the values of the one or more metrics to generate an analysis result; and
select the one or more selected locations based on the analysis result.

17. A non-transitory computer-readable storage medium, the computer-readable storage medium including instructions that when executed by a computer, cause the computer to:

select, from respective locations in a network, one or more selected locations within the network to perform one or more network functions;

provision, at the one or more selected locations, the one or more network functions on respective network devices, including provisioning an inline network function of the one or more network functions in a data plane of one of the respective network devices, wherein: the inline network function that is configured to be in-lined directly in a hardware offload device, and the inline network function is performed without a virtual machine and without a container;

determine values of one or more metrics for the one or more network functions and one or more data flows through the respective locations within a network;

analyze the values of the one or more metrics to generate an analysis result; and select the one or more selected locations based on the analysis result.

* * * * *